(12) United States Patent
Ragland et al.

(10) Patent No.: US 11,579,944 B2
(45) Date of Patent: Feb. 14, 2023

(54) SYSTEM, APPARATUS AND METHOD FOR CONFIGURABLE CONTROL OF ASYMMETRIC MULTI-THREADING (SMT) ON A PER CORE BASIS

(71) Applicant: Intel Corporation, Santa Clara, CA (US)

(72) Inventors: Daniel J. Ragland, Sherwood, OR (US); Guy M. Therien, Beaverton, OR (US); Ankush Varma, Portland, OR (US); Eric J. DeHaemer, Shrewsbury, MA (US); David T. Mayo, Boxborough, MA (US); Ariel Gur, Atlit (IL); Yoav Ben-Raphael, Haifa (IL); Mark P. Seconi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/190,806

(22) Filed: Nov. 14, 2018

(65) Prior Publication Data

US 2019/0079806 A1  Mar. 14, 2019

(51) Int. Cl.
*G06F 9/50* (2006.01)
*G06F 9/52* (2006.01)
*G06F 13/20* (2006.01)
*G06F 1/28* (2006.01)
*G06F 1/324* (2019.01)
*G06F 1/3203* (2019.01)
*G06F 1/3296* (2019.01)
*G06F 1/3287* (2019.01)

(52) U.S. Cl.
CPC .............. *G06F 9/52* (2013.01); *G06F 1/28* (2013.01); *G06F 1/3203* (2013.01); *G06F 1/324* (2013.01); *G06F 9/5044* (2013.01); *G06F 9/5094* (2013.01); *G06F 13/20* (2013.01); *G06F 1/3287* (2013.01); *G06F 1/3296* (2013.01)

(58) Field of Classification Search
CPC ....................................................... G06F 9/52
See application file for complete search history.

(56) References Cited

U.S. PATENT DOCUMENTS

| 8,458,709 B2 | 6/2013 | Armstrong et al. |
| 2007/0204137 A1* | 8/2007 | Tran ................... G06F 1/324 712/214 |
| 2008/0114973 A1 | 5/2008 | Norton et al. |

(Continued)

OTHER PUBLICATIONS

International Searching Authority, "Notification of Transmittal of the International Search Report and the Written Opinion of the International Searching Authority," dated Feb. 7, 2020, in International application No. PCT/US2019/056842.

(Continued)

*Primary Examiner* — Sisley N Kim
(74) *Attorney, Agent, or Firm* — Trop, Pruner & Hu, P.C.

(57) ABSTRACT

In one embodiment, a processor includes: a plurality of cores each comprising a multi-threaded core to concurrently execute a plurality of threads; and a control circuit to concurrently enable at least one of the plurality of cores to operate in a single-threaded mode and at least one other of the plurality of cores to operate in a multi-threaded mode. Other embodiments are described and claimed.

18 Claims, 22 Drawing Sheets

(56) References Cited

U.S. PATENT DOCUMENTS

| | | | |
|---|---|---|---|
| 2009/0328055 A1* | 12/2009 | Bose | G06F 1/3203 |
| | | | 718/105 |
| 2013/0086564 A1* | 4/2013 | Felch | G06F 8/456 |
| | | | 717/145 |
| 2013/0191832 A1 | 7/2013 | Busaba et al. | |
| 2015/0089183 A1* | 3/2015 | Bains | G06F 12/0292 |
| | | | 711/202 |
| 2015/0277921 A1* | 10/2015 | Bradbury | G06F 9/30145 |
| | | | 712/215 |
| 2015/0277948 A1 | 10/2015 | Bradbury et al. | |
| 2015/0339120 A1 | 11/2015 | Bradbury et al. | |
| 2015/0370568 A1* | 12/2015 | Robertson | G06F 9/3851 |
| | | | 712/43 |
| 2017/0177046 A1 | 6/2017 | Garg et al. | |
| 2019/0163512 A1* | 5/2019 | Hackett | G06F 9/45558 |

OTHER PUBLICATIONS

Intel Corporation, "Intel® Hyper-Threading Technology, Technical User's Guide," Jan. 2003, 44 pages.

India Patent Office, Office Action dated Aug. 17, 2022 in India Patent Application No. 202047055051 (7 pages).

European Patent Office, Office Action dated Jul. 5, 2022 in European Patent Application No. 19885784.9 (8 pages).

\* cited by examiner

SYSTEM, APPARATUS AND METHOD FOR CONFIGURABLE CONTROL OF ASYMMETRIC MULTI-THREADING (SMT) ON A PER CORE BASIS

TECHNICAL FIELD

Embodiments relate to control of multi-threading support in a processor.

BACKGROUND

Many processors support a technology called simultaneous multithreading (SMT). In a processor with this multi-threaded support, each physical core can concurrently execute more than a single thread. For example, a 10-core processor appears to have 20 threads. It is expected that future processors will support more than one additional thread per core (e.g., SMT4 with 4 threads per core). The threads share most of the core resources including caches and various stages of the decoding and execution pipelines. Current processors provide this multi-threading support as an option to be fully enabled or completely disabled, but nothing in-between. This arrangement limits flexibility both for system manufacturers and end users. This can also modulate performance for certain software workloads.

DETAILED DESCRIPTION

Figure 1:
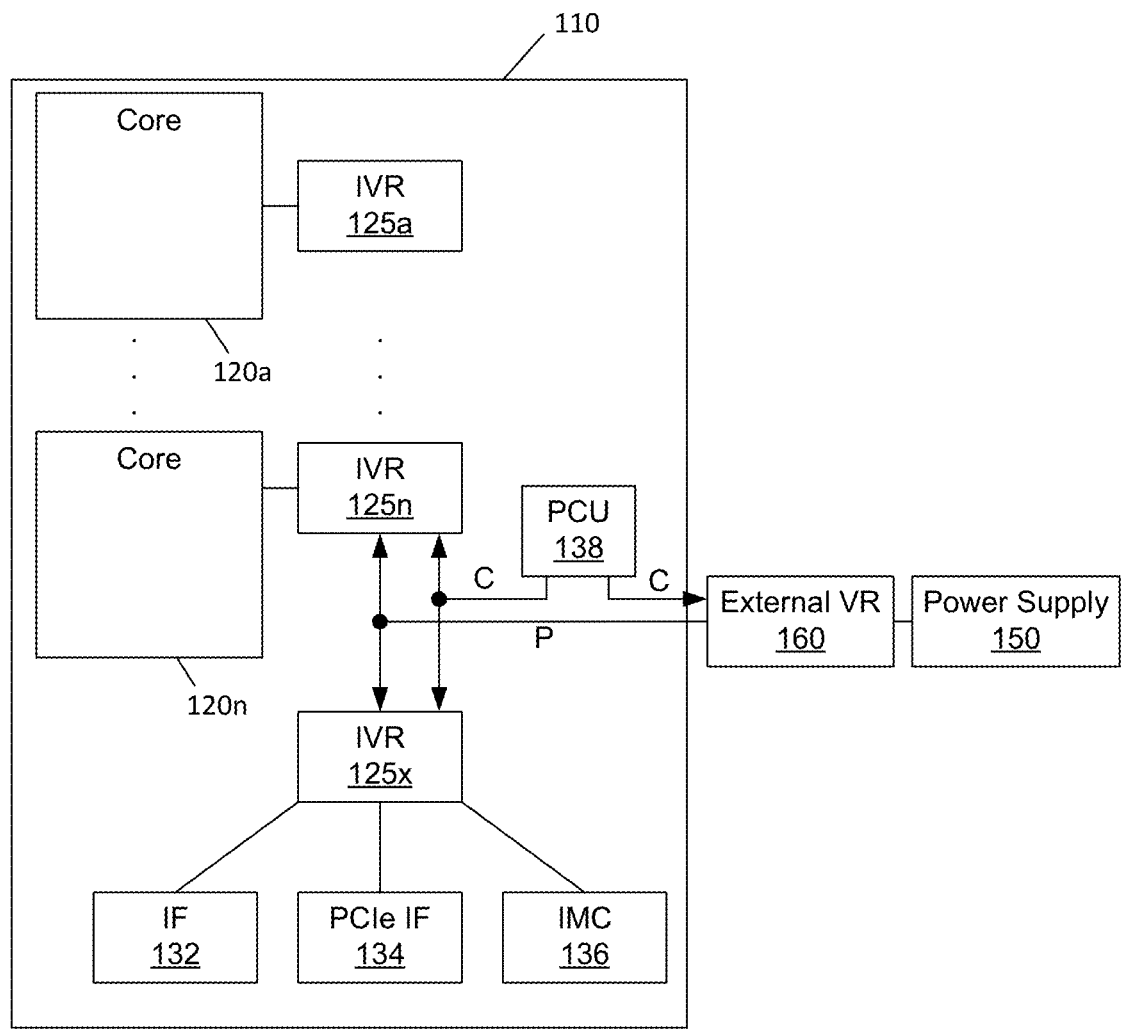
FIG. 1 is a block diagram of a portion of a system in accordance with an embodiment of the present invention.

In various embodiments a processor or other system on chip (SoC) may be provided with a per core selective multi-thread (MT) capability. That is, embodiments enable multiple cores of a processor to operate with asymmetric capabilities with regard to multi-thread support. In different use cases, no cores of the processor may be enabled for multi-thread support, all cores may be enabled for multi-thread support, or a mix can be realized in which some cores are enabled for multi-thread support and some cores are not.

To this end, embodiments provide techniques to enable various entities to control such operation. These entities may include original equipment manufacturer/original device manufacturer (OEM/ODM) entities which may enable this capability and configure particular processors with a given arrangement of cores/available threads. As examples, such OEM/ODMs may implement this configuration capability within firmware such as a basic input/output system (BIOS).

In other cases, the processor manufacturer itself may configure the processor to have this asymmetric multi-thread support, e.g., by way of selective fuse information that enables multi-thread operation for one or more cores, and disables it for one or more other cores (even though such cores as fabricated have inherent hardware support for such capability).

And further still, embodiments may enable an end user to control the configurability of multi-thread support on a per core basis (assuming the end user is allowed to do so for a given processor configuration). This user control may be predicated on allowing the user to do so, as set by the manufacturer (e.g., by way of fusing) or by the OEM/ODM, e.g., based on BIOS capability.

In addition, embodiments may enable dynamic control of the per core selective multi-thread capability. That is, within a single boot or other reset cycle a processor itself, e.g., autonomously or based on BIOS or OS support, may automatically and dynamically change multi-thread support configurations for different cores based on particular workloads being performed, and/or based on performance and thermal requirements. This is so, as while MT operation in general is very helpful in increasing system performance, there are scenarios where it is not helpful. Examples include certain usage scenarios where not all available threads are needed, in other words, where a processor includes sufficient cores to perform a given workload. As another example, MT support may not enhance software execution when the software is not optimized for a large number of threads. MT support also may not aid in overclocking scenarios when absolute frequency of a physical core is more important than additional MT threads.

Embodiments provide easy stock keeping unit (SKU) differentiation around MT. As such, new segmentation opportunities may be realized where processor product SKUs can be productized with n number of MT threads enabled per core. With an embodiment a SKU can be made having 10 cores and only 15 threads, for example. Embodiments thus provide the ability to optimize performance of processor SKUs to fit them within specific power/thermal targets.

Embodiments thus can enable/disable MT threads on a per core basis. Such asymmetric MT support may be managed using BIOS, with minor OS adaptation to enumerate the cores/threads at boot time or optionally based at least in part on continual monitoring in real-time. With embodiments, users or BIOS can improve performance and overclocking results by only enabling the MT threads needed to fit their specific need. As a result, an increased ability to fine tune systems for better performance results, including enabling enhanced overclocking scenarios. With embodiments users can configure MT threads per core within BIOS. A very large performance improvement is possible when some MT threads are disabled. For example the processor can reach higher frequencies when overclocking. As processors move into the future and have up to 4 MT threads per core, the benefit to segmentation increases. In this way a manufacturer can offer only 2 MT threads per core on certain SKUs and a full 4 threads on other products, for example.

Embodiments may utilize processor microcode (uCode) and power management circuitry (including so-called power management code or pCode) to enable or disable MT/SMT threads for each individual physical core. In different scenarios, the selection of which threads on which cores to enable can be made via fuse settings (SKU-ing) or BIOS (to allocate performance tuning and overclocking scenarios). Users can interact with the BIOS to make specific selections or ODM's can preconfigure BIOS to their liking, in different cases.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology future' such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120. One power management logic unit included in PCU 138 may be a selective multi-threading control circuit, which may be used to selectively enable none, some, or all cores for multi-threaded operation, as described herein.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Figure 2:
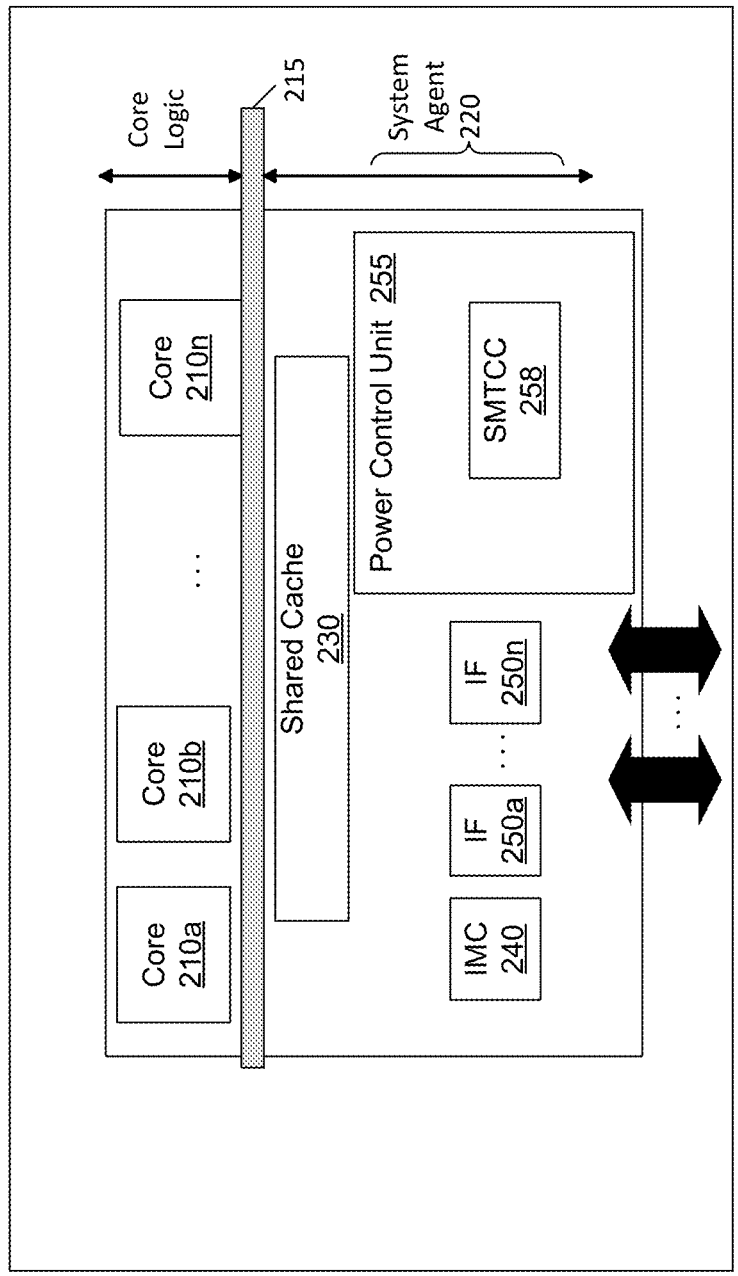
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a selective multi-thread control circuit 258, which may cause one or more cores 210 to operate in a multi-threaded mode and one or more other cores 210 to operate in a single-threaded mode, according to embodiments as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
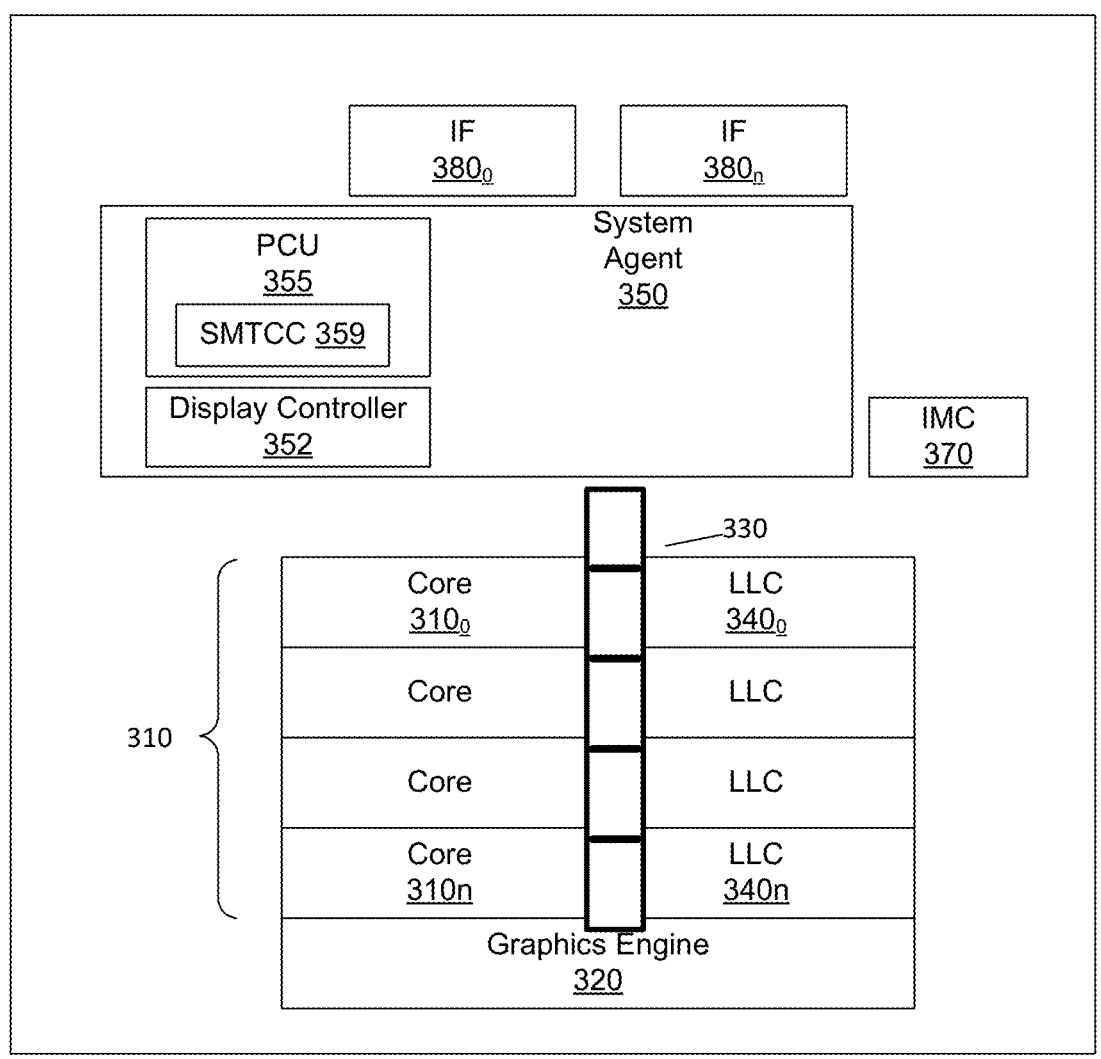
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a selective multi-thread control circuit 358, which may cause one or more cores 310 to operate in a multi-threaded mode and one or more other cores 310 to operate in a single-threaded mode, according to embodiments as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
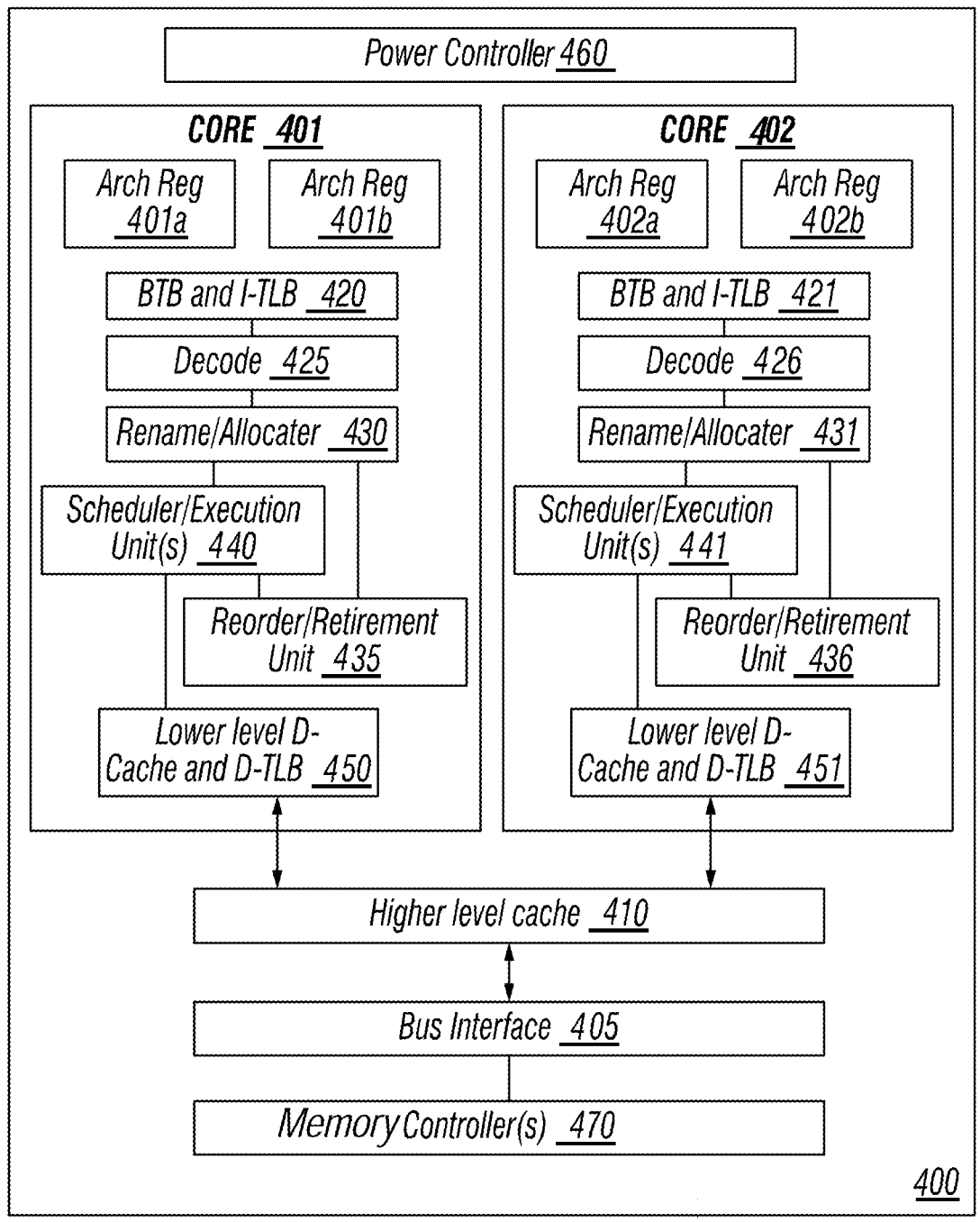
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. In addition, cores 401 and 402 may be configured the same or differently with respect to multi-threading support. That is, in accordance with embodiments herein one, both or none of cores 401, 402 may be enabled for MT support.

Yet to further the discussion, the functional units illustrated in core 401 are described in further detail below, as the units in core 402 operate in a similar manner. As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
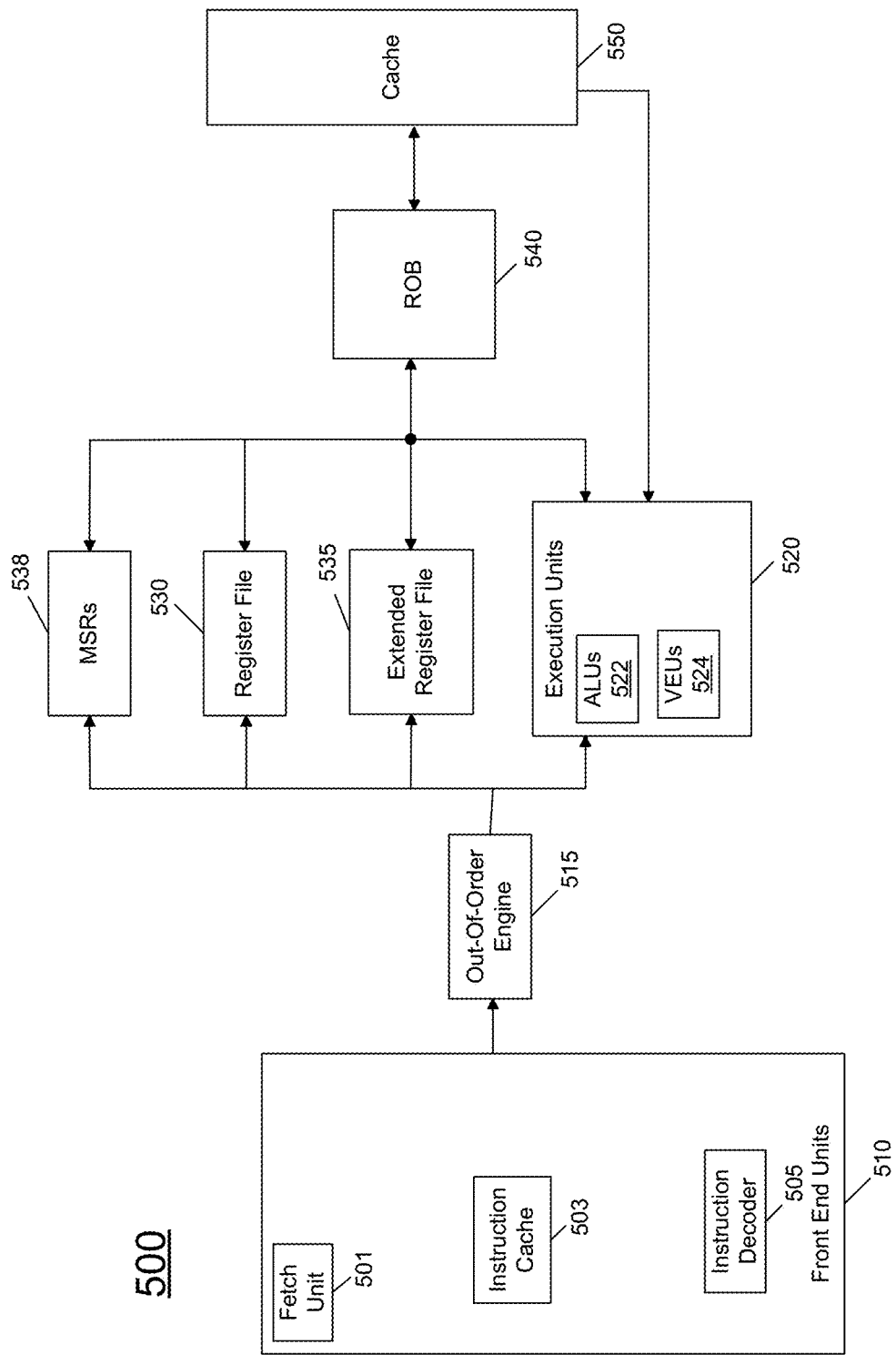
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core). Note that for purposes of supporting multi-threading, multiple sets of registers within various register files may be provided such that they may be used concurrently by the different threads. Note however that the remaining structures of core 500, including front end units 510 and execution units 520, are not replicated.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
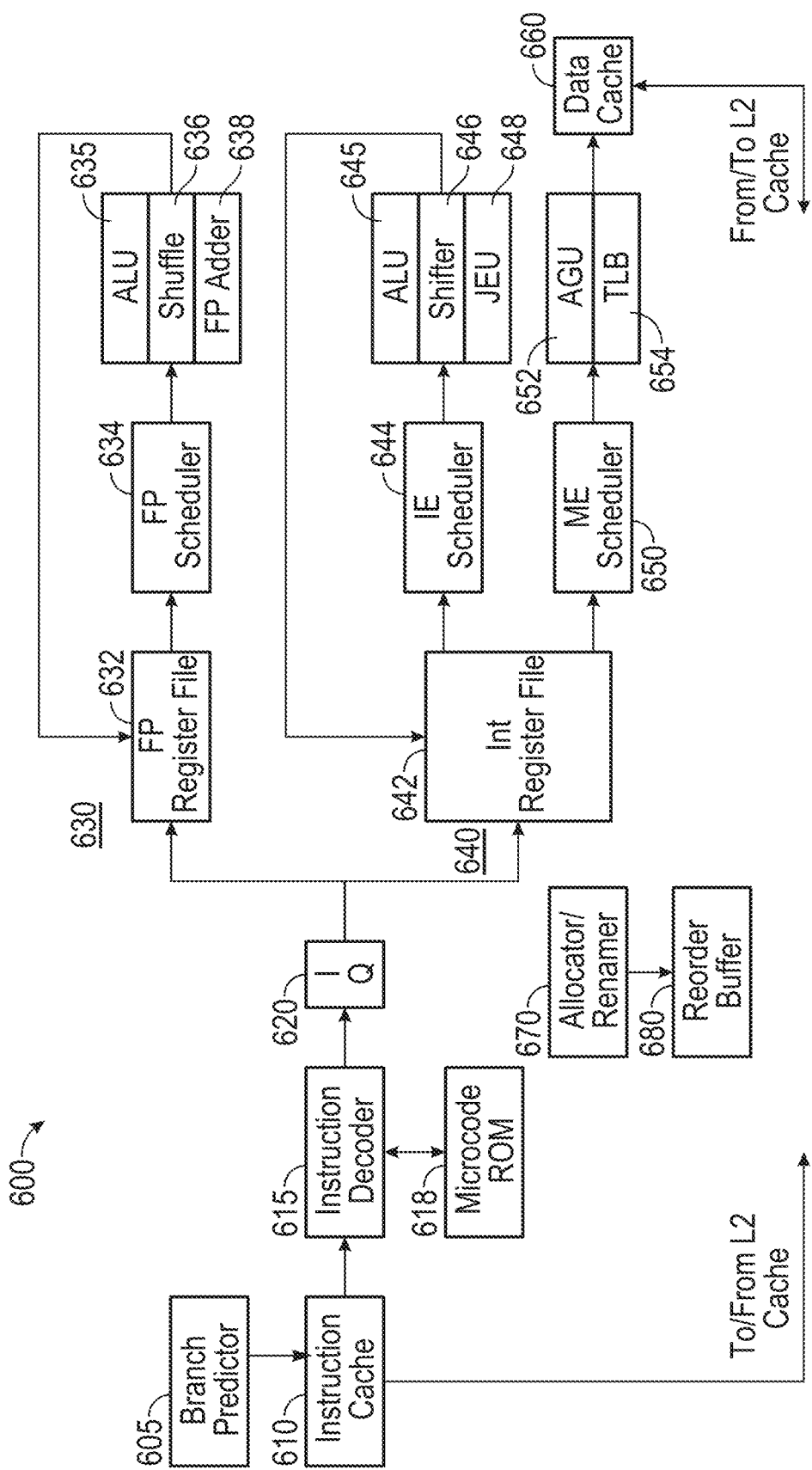
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
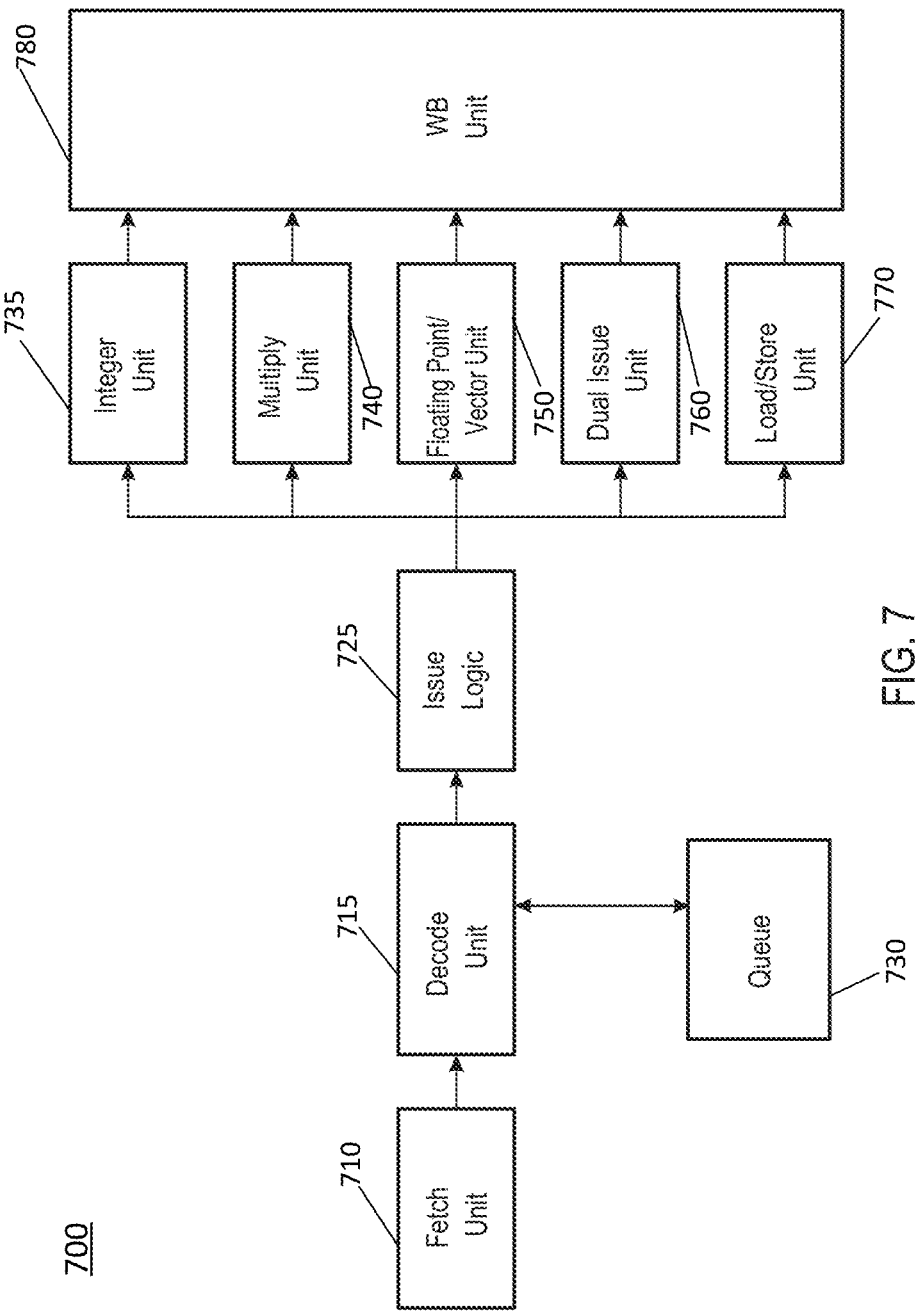
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
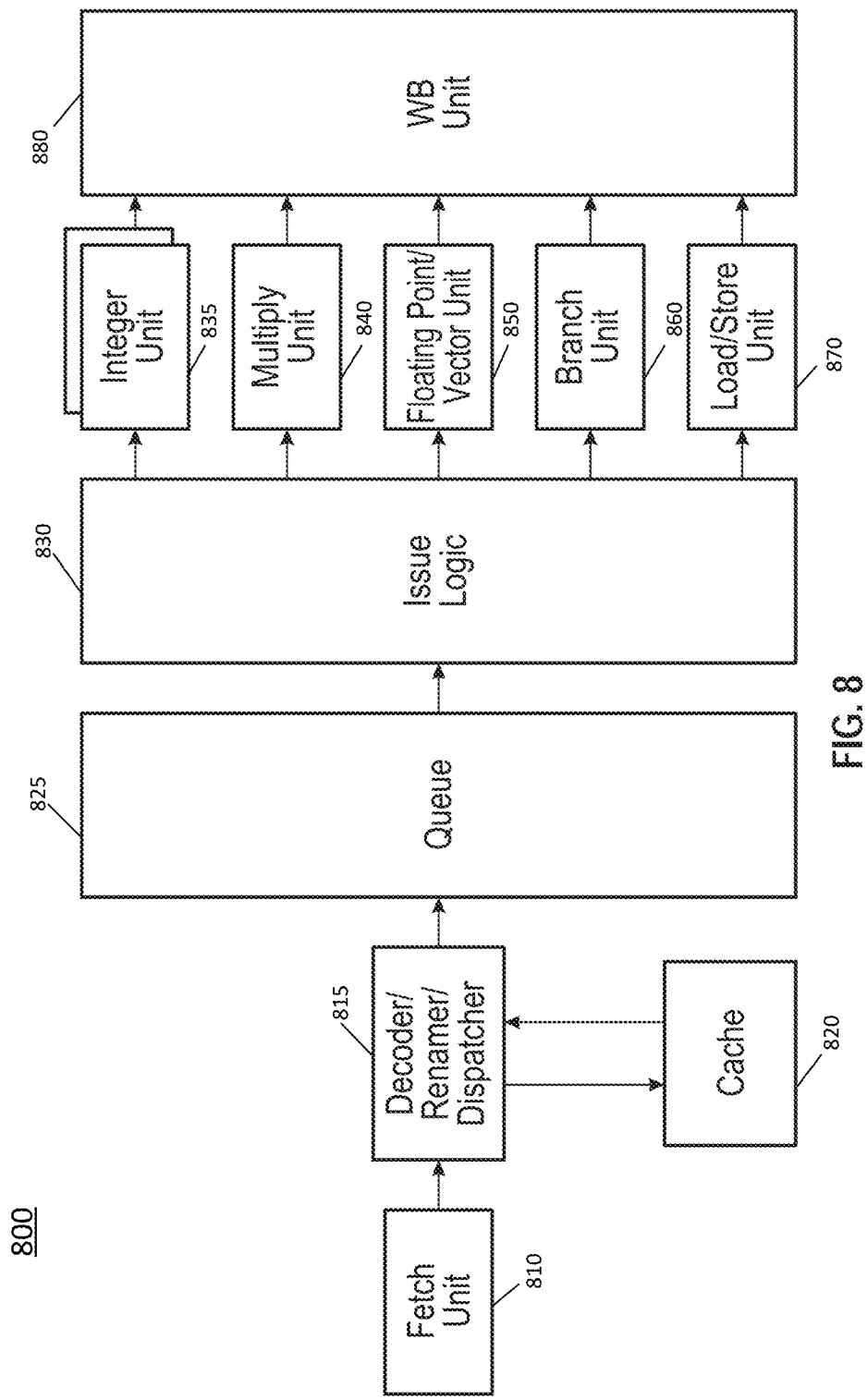
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
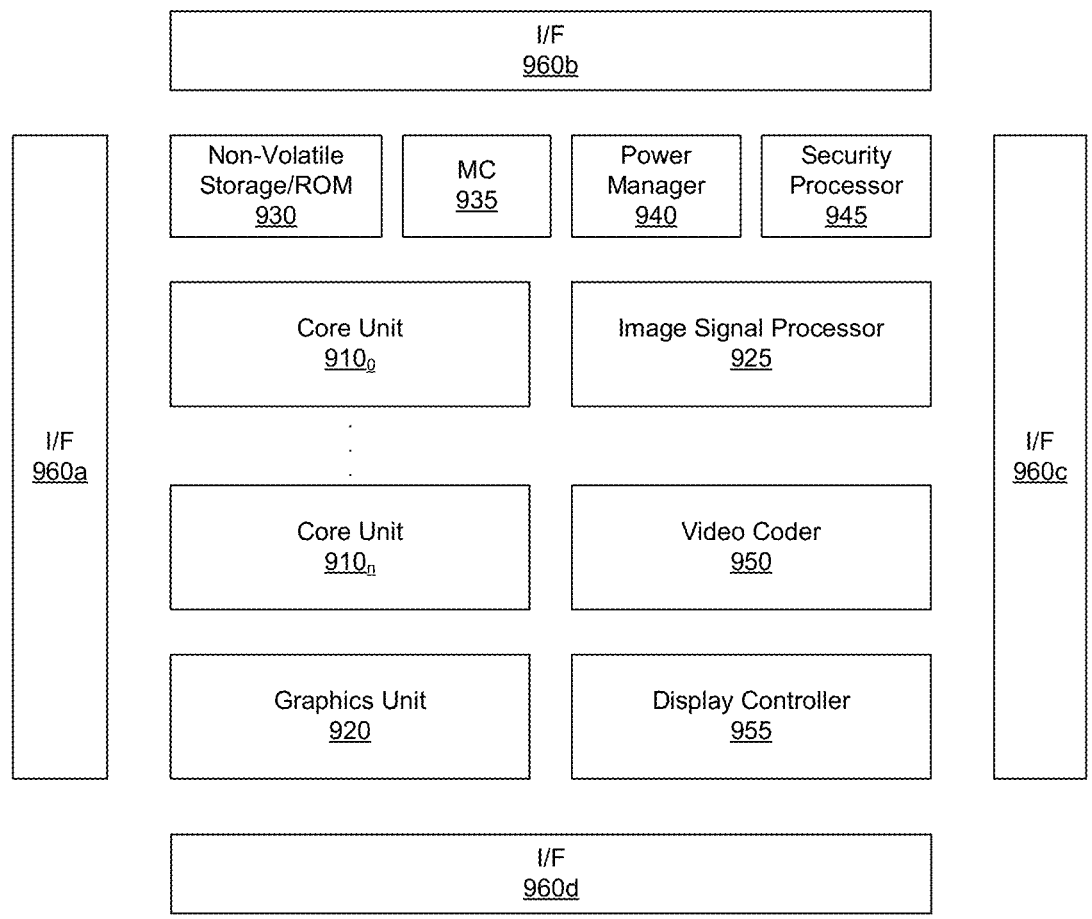
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform various power management techniques and the selective MT configurable control described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
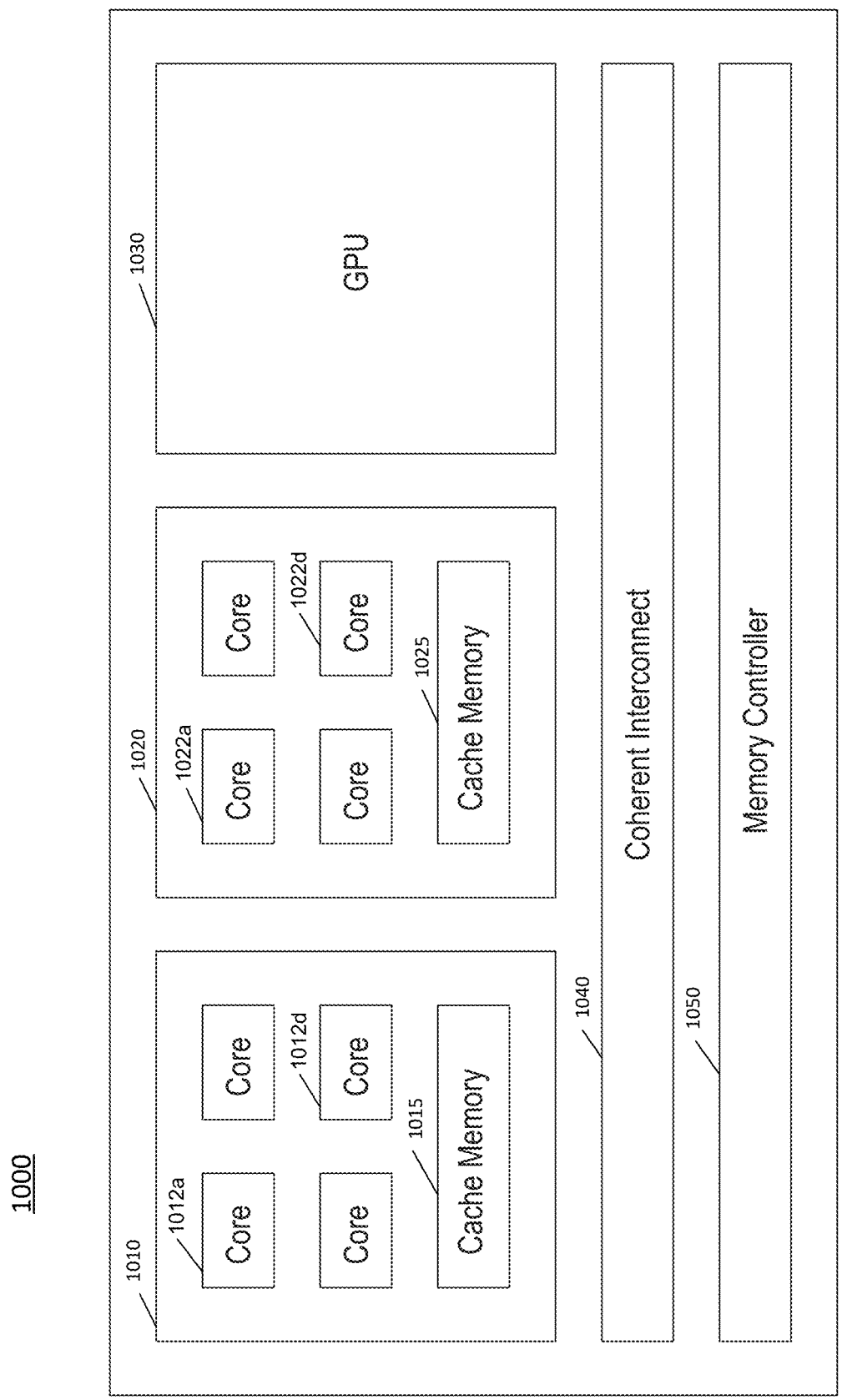
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g., web serving, network processing, switching or so forth) also may be provided. In addition, an input/output interface may be present to couple such accelerators to off-chip components.

Figure 11:
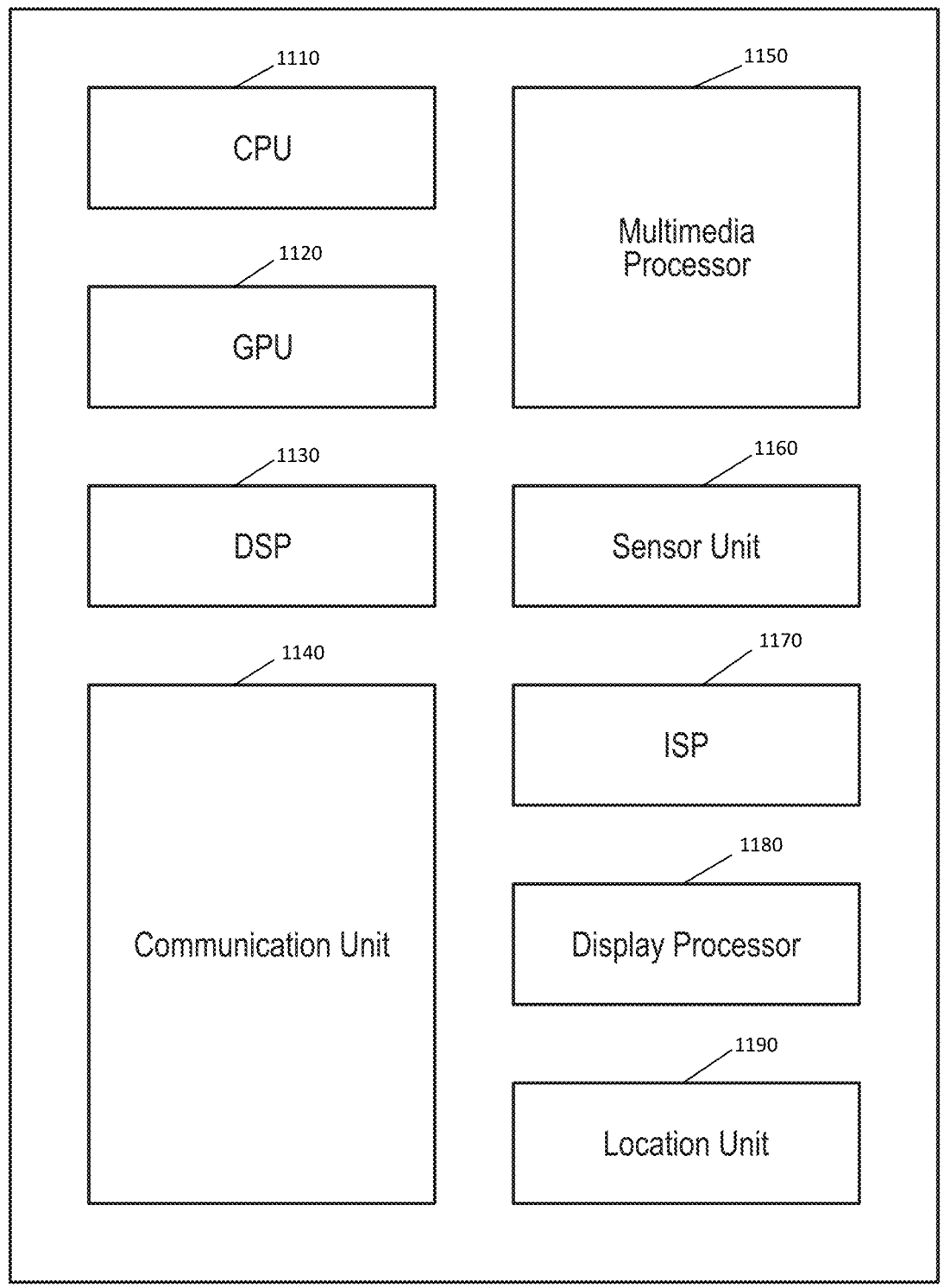
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
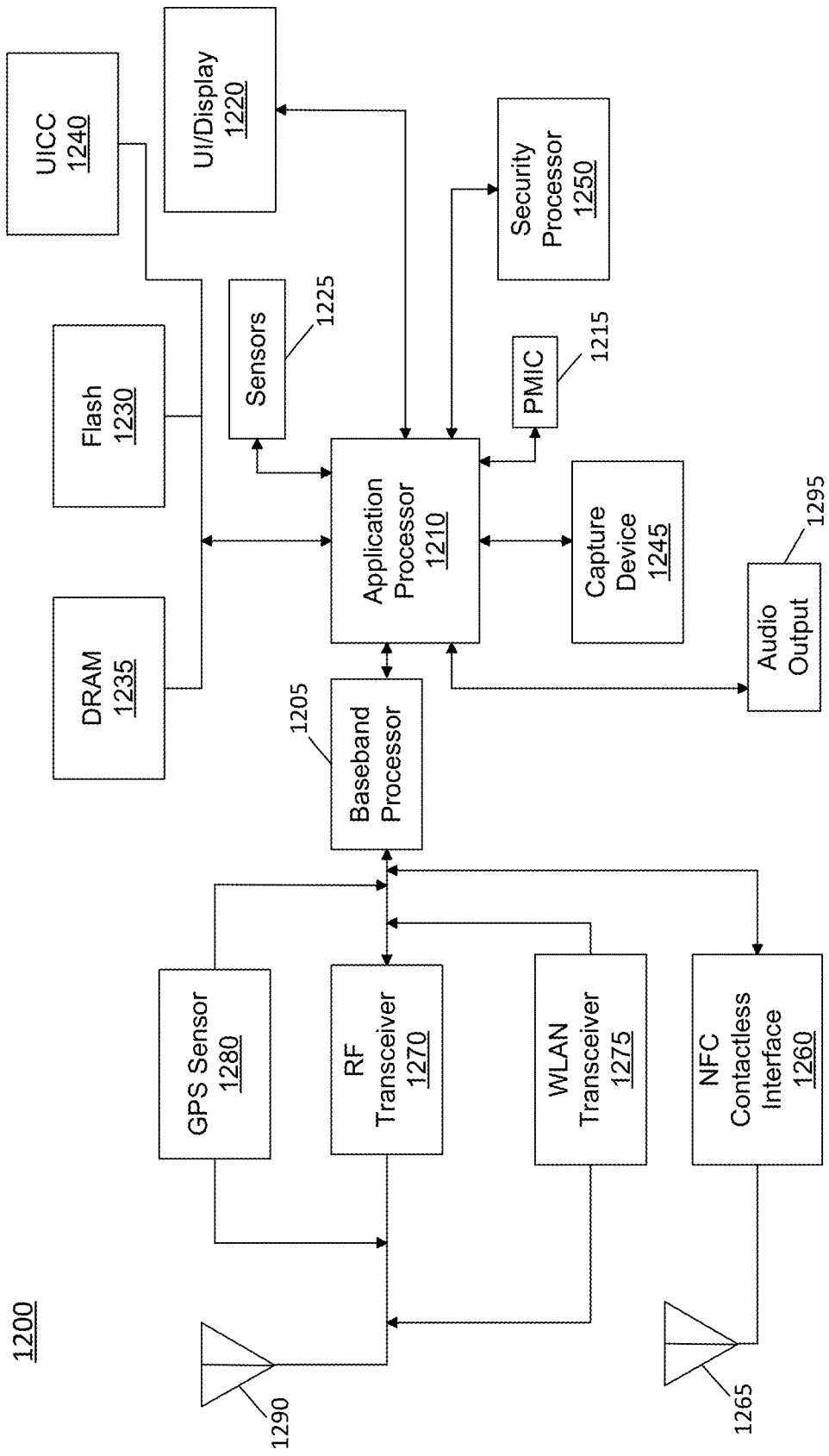
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and can be configured, statically or dynamically, for selective MT support in which a subset of cores can be selectively enabled for MT operation, as described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
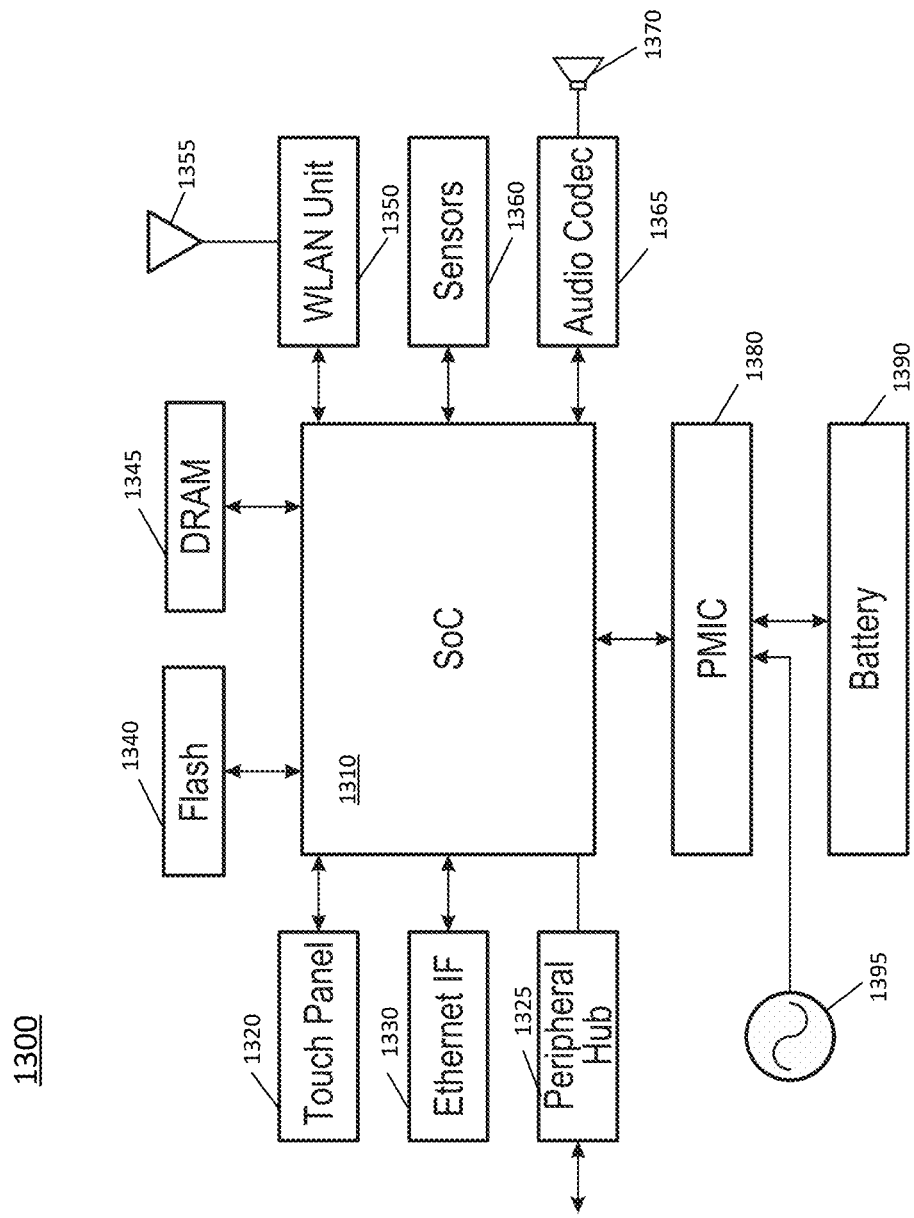
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and can be configured, statically or dynamically, for selective MT support in which a subset of cores can be selectively enable for MT operations, as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
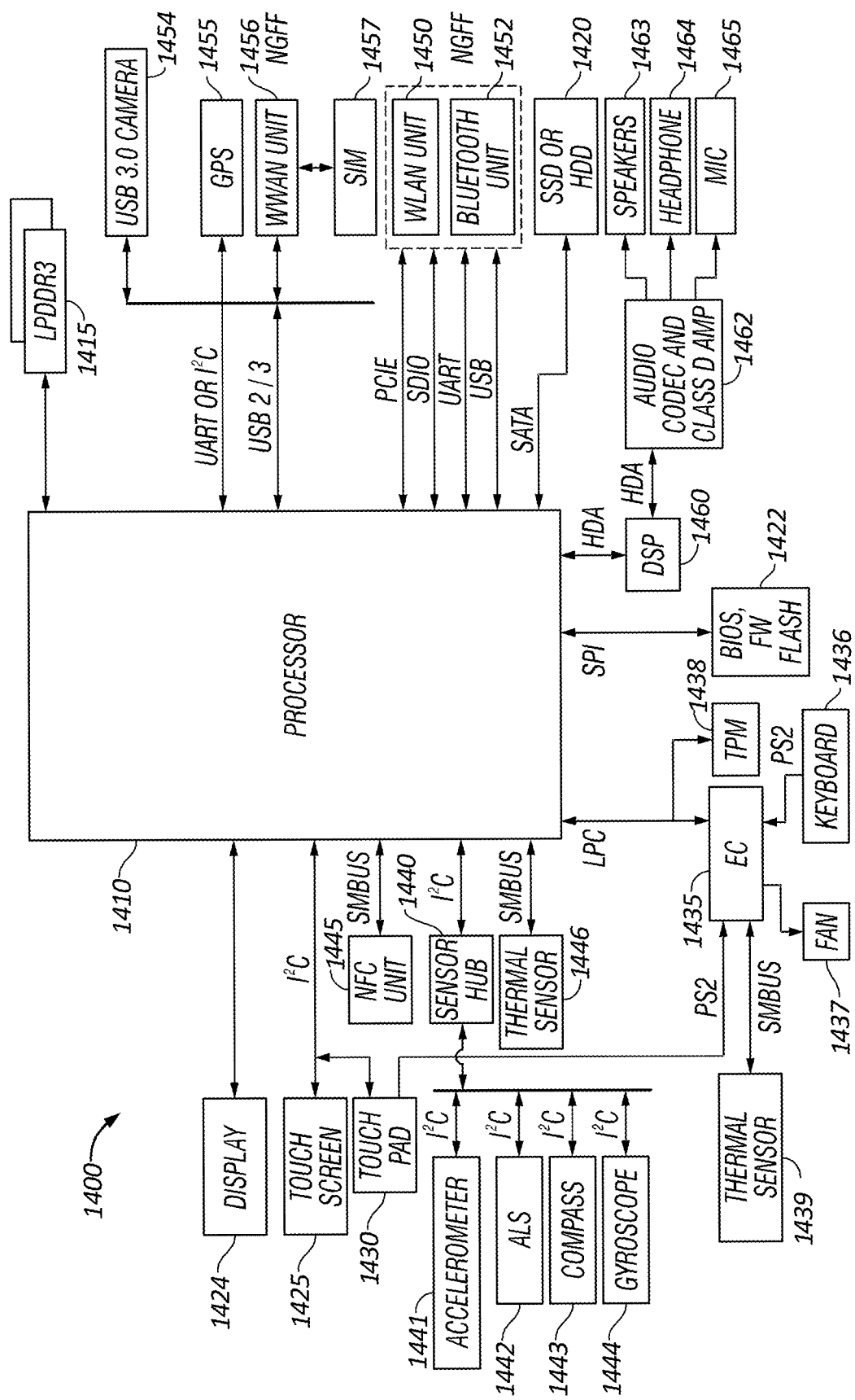
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
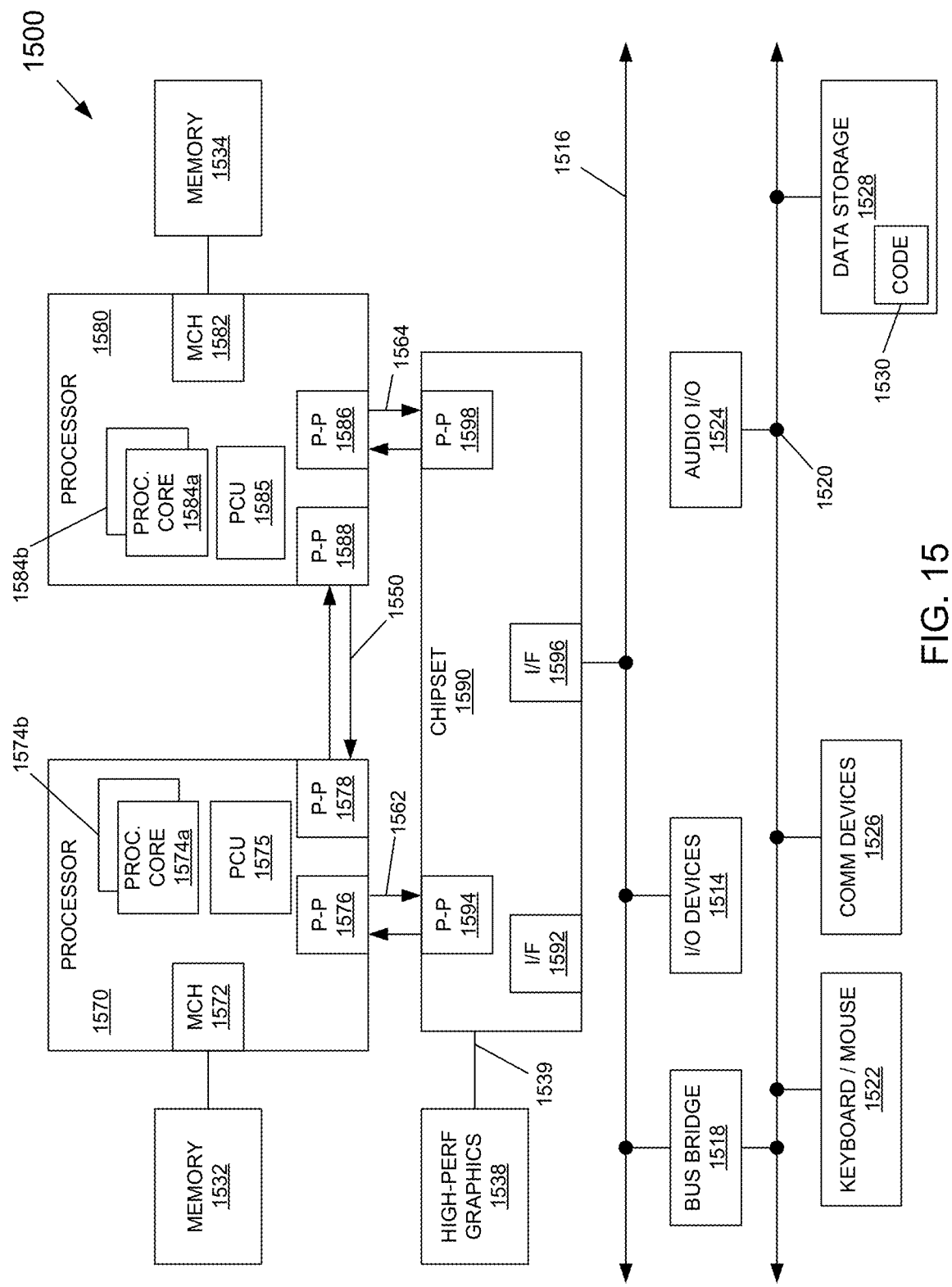
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574*a* and 1574*b* and processor cores 1584*a* and 1584*b*), although potentially many more cores may be present in the processors. Each of the processors can include a PCU 1575, 1585 to perform processor-based power management, and to selectively control cores 1574 to operate in an asymmetric manner with regard to multi-threading operation.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
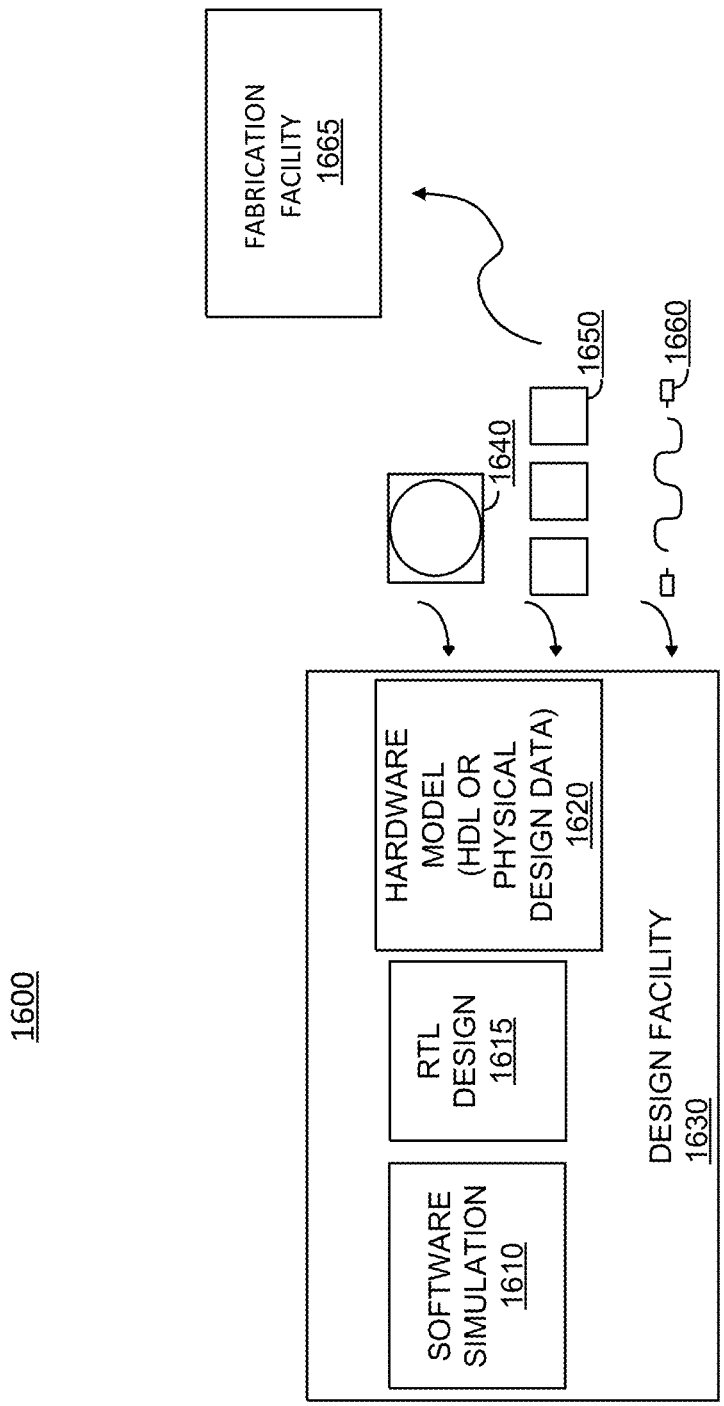
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
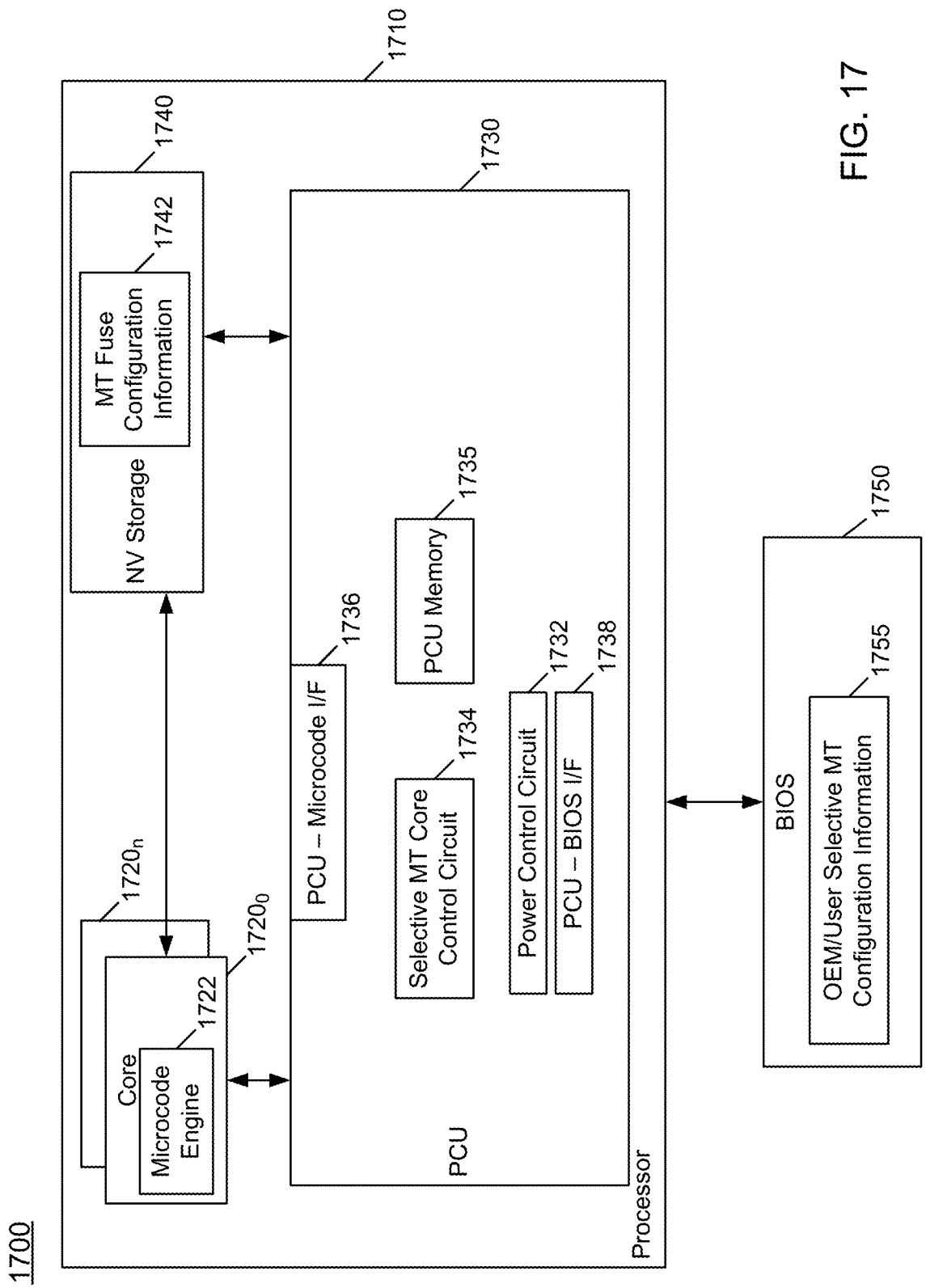
FIG. 17 is a block diagram of a portion of a system in accordance with an embodiment.

Referring to FIG. 17, shown is a block diagram of a portion of a system in accordance with an embodiment. As shown in FIG. 17, system 1700 may be any type of computing system, ranging from a small portable device such as smartphone, tablet computer, laptop computer and so forth, to a larger device including desktop and other personal computers, server computers and so forth. In the high level shown in FIG. 17, a processor 1710 such as a given multicore processor or other SoC couples to a BIOS 1750, e.g., as implemented in a non-volatile storage such as a given read only memory (ROM) chip.

In the high level view of FIG. 17, details of processor 1710 involved in selective per core multi-threading are shown. As seen, processor 1710 includes a plurality of cores $1720_0$-$1720_n$. Note that in different implementations, cores 1720 may be homogeneous cores or one or more heterogeneous core types may be present, such as a mix of in-order and out-of-order cores. In the high level shown in FIG. 17, each core 1720 includes a microcode engine 1722 to execute microcode instructions stored within the core. Of note herein, microcode engine 1722 may execute instructions to configure a given core for selective single-threaded or multi-threaded mode of operation. In embodiments, this control may be performed either statically as configured by a manufacturer of the processor or an original equipment manufacturer (OEM) or by an end user, or dynamically as described herein.

To this end, core 1720 may interface with a power control unit (PCU) 1730, via a PCU-microcode interface 1736. As further shown, cores 1720 and PCU 1730 further couple to a non-volatile storage 1740, such as a given fuse storage. Of interest herein, non-volatile storage 1740 includes a storage portion 1742 to store multi-thread fuse configuration information, which may be written during manufacture of processor 1710. This information may, upon boot operation within processor 1710 (and prior to execution of BIOS code), be accessed via PCU 1730, and more specifically via a selective multi-thread core control circuit 1734 to obtain this configuration information and store it locally, e.g., in a PCU memory 1735, such as a RAM storage within PCU 1730. Based on this information, selective multi-thread core control circuit 1734 may communicate information via interface 1736 to corresponding microcode engines 1722 to enable appropriate configuration of given cores for single-thread or multi-thread modes of operation.

Similarly PCU 1730, and more specifically selective multi-thread core control circuit (PCC) 1734, also may communicate information to provide to microcode engine 1722 that is received via BIOS 1750. More specifically as described further herein, either within the BIOS code itself or obtained via a user interface within the BIOS code, OEM/user selective multi-thread configuration information 1755 may be present within BIOS 1750 and similarly communicated to PCU 1730 to enable its use in configuring cores 1720 for an appropriate thread mode of operation. Further as described herein, PCU 1730 also includes a power control circuit (PCC) 1732, which may dynamically control power consumption within processor 1730. For example, PCC 1732 may control particular cores 1720 to operate in certain performance states and/or to cause one or more cores to enter into idle states based on activity levels, workload, thermal, power or other environmental conditions. Understand while shown at this high level in the embodiment of FIG. 17, many variations and alternatives are possible.

Figure 18:
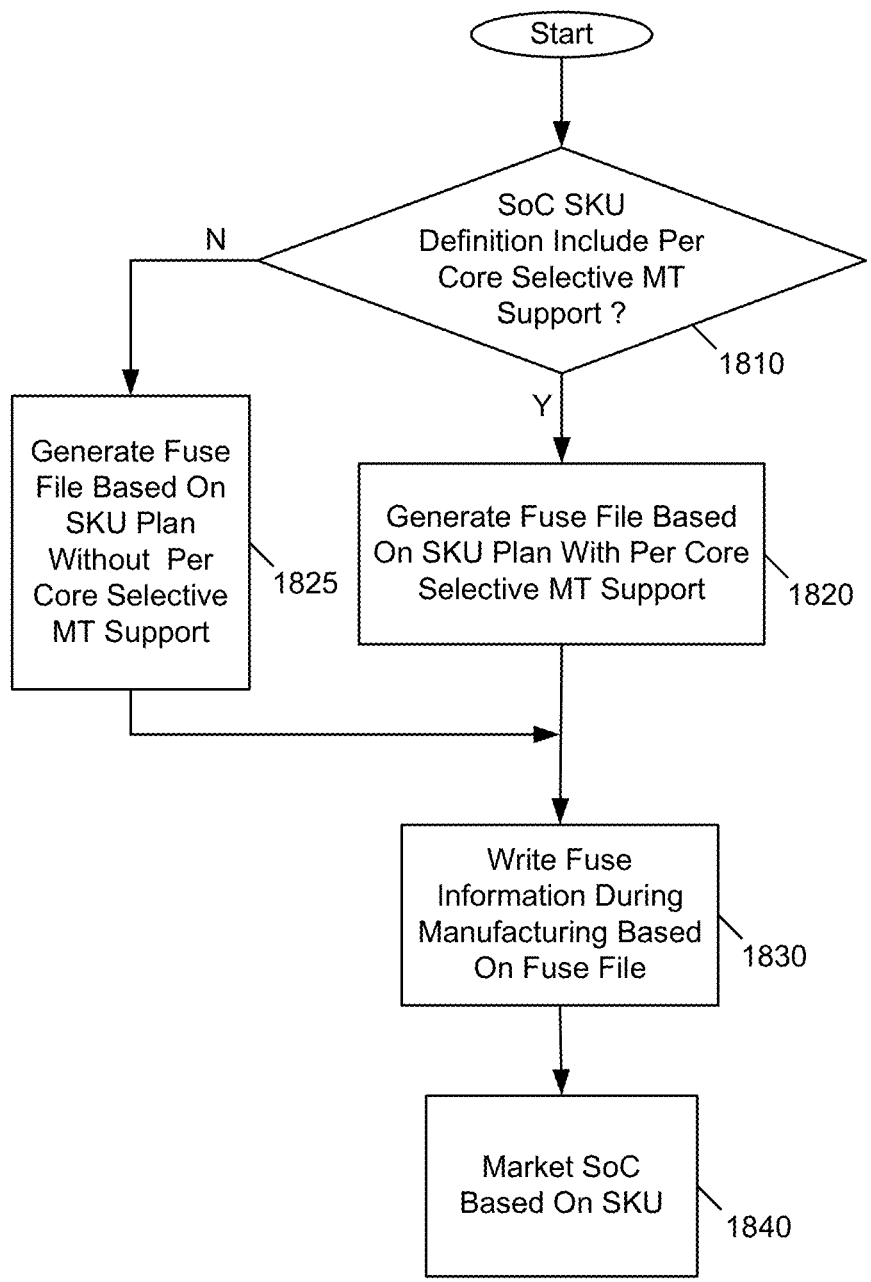
FIG. 18 is a flow diagram of a method in accordance with an embodiment of the present invention.

Referring now to FIG. 18, shown is a flow diagram of a method in accordance with an embodiment of the present invention. As shown in FIG. 18, method 1800 is a method for planning and manufacturing an SoC in accordance with an embodiment. As such, method 1800 may be performed by hardware circuitry, firmware, software and/or combinations thereof. In a particular embodiment, method 1800 may be performed by one or more design systems to design an SoC and provide files for use by manufacturing equipment to manufacture the SoC, which may fabricate the SoC under control of machine-readable instructions. As seen, method 1800 begins by determining, whether a stock keeping unit (SKU) for the SoC is defined that includes the selective multi-threading control described herein, namely asymmetric SMP capability (diamond 1810). If so, control passes to block 1820 where a fuse file may be generated that is based on this SKU plan with per core selective MT support. Otherwise, at block 1825, the fuse file may be generated based on this SKU plan without per core selective MT support. Note that fuses may be used to store SKU-level details relating to desired SMT/MT enablement on per core basis. Fuse bits may be allocated to indicate the SMT/MT thread count enabled for the processor. As one example, fuse bits may be provided to indicate how many SMT/MT threads are to be enabled. For example, the available fuse bits may indicate an integer value, where, e.g., a value of 4 means to enable all 4 SMT/MT threads in a 4 SMT processor. A value of 0 means to disable all MT threads. As another example, a bit mask may be used to indicate specifically which SMT/MT threads on which physical cores to enable. For example, an 8-core processor would use 8 bits as follows: 10010001. In this example only the SMT/MT threads associated with the $4^{th}$ and $8^{th}$ cores are enabled. In some embodiments, it is also possible to enable a subset of MT threads for certain cores. In embodiments, uCode/pCode reads these fuses and then configures accordingly.

In either case, based at least in part on this fuse file, fuses may be written into a fuse storage of the SoC during manufacture (block 1830). As such, a finished SoC product is realized that has support for multi-threading either on a per core selective basis using the techniques described herein or, if this per core capability is disabled, the SoC may be fused to either enable all cores to have multi-thread operation or to disable multi-thread operation completely. Thus at block 1840 depending on the particular product's SKU, the SoC may be marketed and sold to consumers, e.g., OEMs with MT support as configured. Understand while shown at this high level in the embodiment of FIG. 18, many variations and alternatives are possible.

Figure 19:
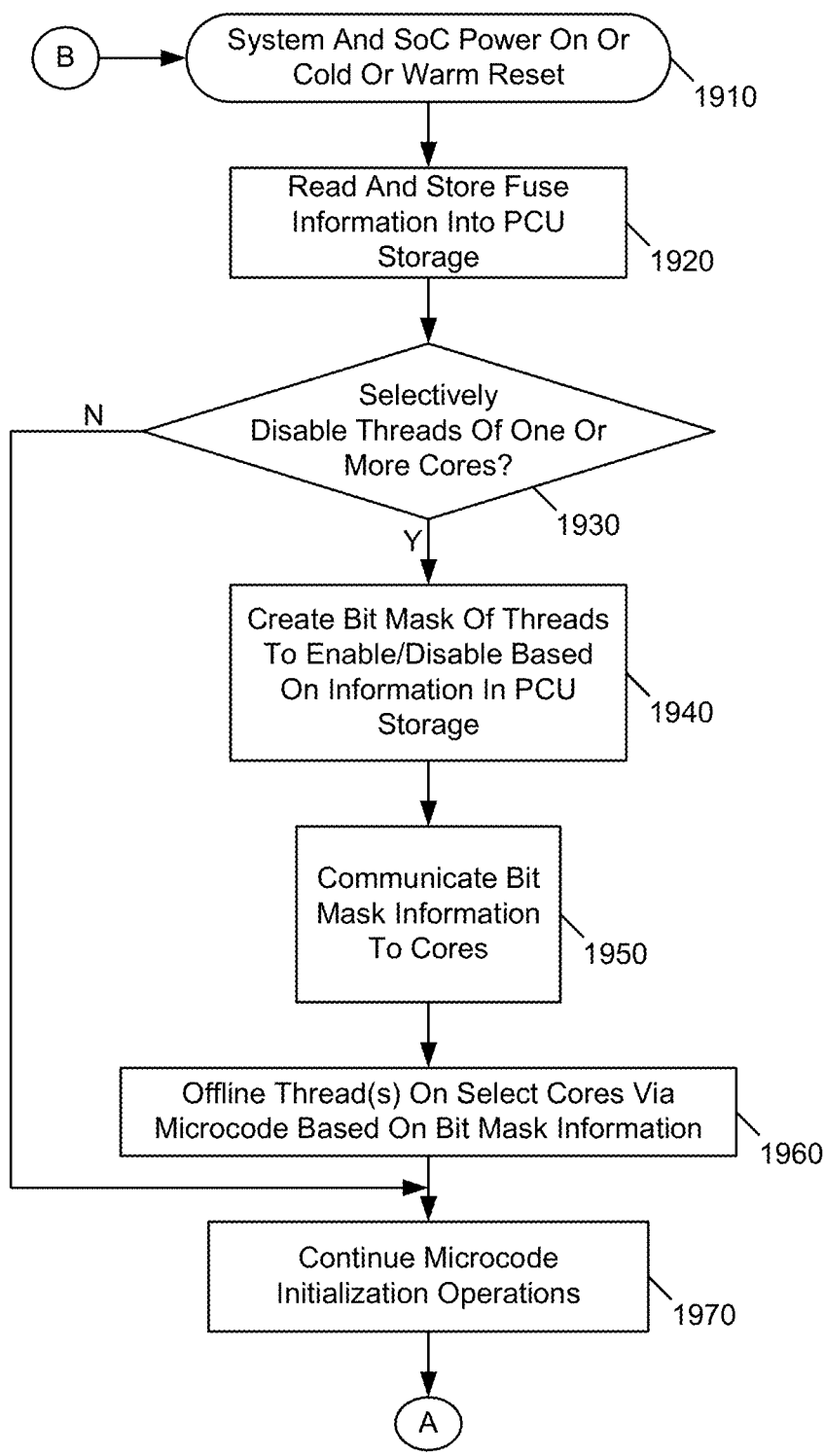
FIG. 19 is a flow diagram of a method in accordance with another embodiment of the present invention.

Referring now to FIG. 19, shown is a flow diagram of a method in accordance with another embodiment of the present invention. As shown in FIG. 19, method 1900 is a method for performing processor-internal initialization and configuration operations to enable selective per core multi-threading support in accordance with an embodiment. Note that method 1900 of FIG. 19 is performed at initialization of core activity upon power up or a reset, and prior to any BIOS or other firmware initialization operations. As such, method 1900 may be performed by hardware circuitry, firmware, software and/or combinations thereof, including via hard-coded processor initialization code that executes on hardware of a processor.

As illustrated, method 1900 begins at block 1910 either on a power on of a system including the SoC or a return to a cold or warm reset from other operations, to enable a PCU to receive and process information associated with asymmetric MT capabilities. In an embodiment, a pCode interface can accept OEM or user initiated custom SMT/MT disabled or enabled information. The pCode interface may include a BIOS-to-pCode mailbox or a hardware register that is written to by BIOS. BIOS also can accept pre-defined OEM requests for specific SMT/MT thread disablement/ enablement. Also BIOS allows users, or ODM BIOS automation, to request specific SMT/MT threads to be enabled/ disabled. Optional persistent storage of MT enabled/disable information may be used to make it available on a cold reset.

As shown in FIG. 19, fuse information may be read and stored into a PCU storage (block 1920). Of interest here, this fuse information may include static fuse-based MT configuration information. As described herein, this hard-coded information identifies, for each core, whether it is enabled for multi-threaded operation or not. In an embodiment, this storage may be a pCode RAM storage.

Still with reference to FIG. 19, at diamond 1930 it is determined whether to selectively disable threads of one or more cores. This determination may be based on the fuse information or other MT configuration information, e.g., as obtained from BIOS or user, as described below. If so, control passes to block 1940 where a bit mask may be created. More specifically, this bit mask, which also may be stored in the pCode RAM, can be used to identify, for each core, whether multi-threading is enabled or disabled (and if so, an indication of the number of available threads, in some cases). Next at block 1950, this bit mask information may be communicated directly to the individual cores, e.g., via a PCU-microcode interface. Next at block 1960, microcode of cores that are to be controlled for a single threaded mode (i.e., disabled for multi-thread operation) may execute to offline such multiple threads. As examples, the microcode may perform configuration operations within the core, e.g., to enable bypass paths that bypass multi-thread support structures including additional register sets and other potentially redundant hardware for use in multi-thread operation. As such, this microcode offline operation configures such cores for single thread operation only. Microcode places the disabled threads in a low to no power state. Microcode exposes the core/thread topology via CPUID and/or a given MSR. The PCU and microcode will assume the disabled threads as threads in a deep core C-state and ignore their lack of C-state request. Next at block 1970 additional microcode initialization operations are performed to configure the cores for normal operation. Understand while shown at this high level in the embodiment of FIG. 19, many variations and alternatives are possible.

Figure 20:
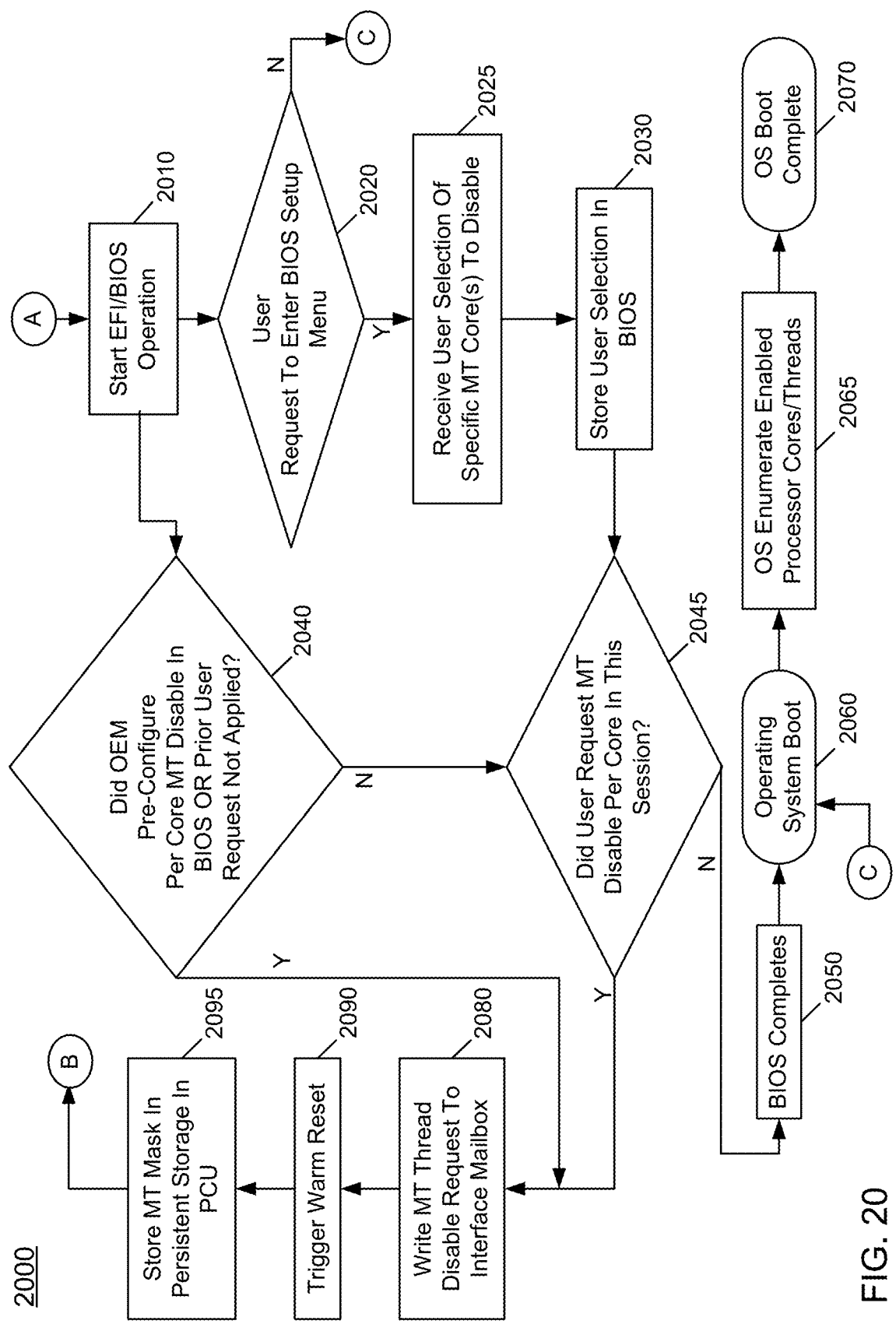
FIG. 20 is a flow diagram of a method in accordance with yet another embodiment of the present invention.

Referring now to FIG. 20, shown is a flow diagram of a method in accordance with yet another embodiment of the present invention. As shown in FIG. 20, method 2000 regards further configuration operations, including configuring a processor for selective per core multi-thread support as described herein. As such, method 2000 may be performed by hardware circuitry, firmware, software and/or combinations thereof.

As illustrated, method 2000 begins by beginning BIOS operations, e.g., via extensible firmware interface (EFI) BIOS operation in response to firmware code (block 2010). Next it is determined at diamond 2020 whether a user request has been received to enter into a BIOS setup menu. As an example, during initialization operations, user may select a predetermined keyboard key, e.g., a given function key, to request entry into this BIOS setup menu.

In embodiments herein, the BIOS setup menu may include one or more user interfaces to seek user input regarding the selective multi-thread control described herein. Assuming that such user request is received, control passes to block 2025 where, via the user interface, a user may select one or more cores for which MT operation is to be disabled. Note that in one implementation, the user interface may provide an input mechanism for each core, to enable the user to dynamically select MT disabling for the core or, when enabled, identify only a subset of multiple threads to be enabled, where a core has support for more than two threads per core. In yet other cases, the user interface may simply provide an indication of the number of cores in a processor and seek user input as to a total number of threads to be enabled. In any event, control next passes to block 2030 where this user selection information may be stored in BIOS.

Still with reference to FIG. 20, it is determined at diamond 2040 whether an OEM itself preconfigured per core MT disabling in BIOS or a user previously requested such operation without this configuration being applied yet. If so, control passes to block 2080 where BIOS may write an MT thread disable request, e.g., to the PCU via a write operation to a control register. Note that this same path may proceed in instances where a user requested MT disabling per core (as determined at diamond 2045).

Otherwise if there is no new change to this selective MT control on this reset cycle of the SoC, control passes to block 2050 where the BIOS completes its operation, and hands off control to an OS boot (block 2060). During such boot, the OS enumerates enabled processor cores and threads (block 2065). In an embodiment, the OS may access information in a multiple APIC descriptor table (MADT). In embodiments herein, BIOS may be configured to write information into such MADT table based at least in part on the selective per core MT configuration information available. Thereafter at block 2070 the OS boot completes.

Still with reference to FIG. 20, from block 2080 control passes to block 2090, where a warm reset is triggered. Thereafter at block 2095, MT mask information may be stored in persistent storage within the PCU. That is, for the brief duration of a warm reset, this writing of mask information, e.g., to the pCode RAM, may remain persistent. And thus upon the warm reset that occurs at block 2010 (et seq.), this information can be accessed and used to cause microcode to configure cores appropriately, as discussed above with regard to method 2000. Understand while shown at this high level in the embodiment of FIG. 20, many variations and alternatives are possible.

Figure 21:
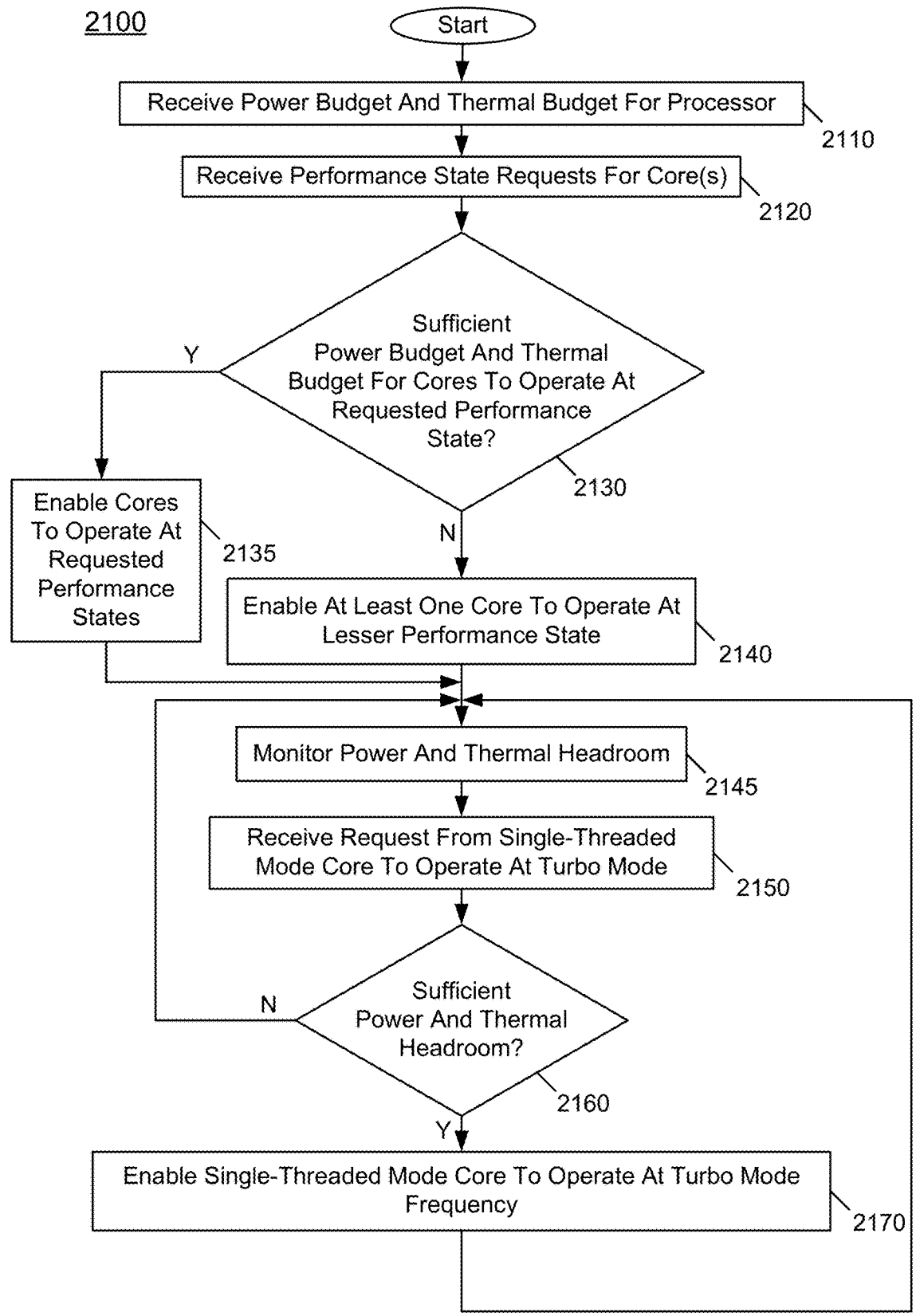
FIG. 21 is a flow diagram of method in accordance with another embodiment of the present invention.

Referring now to FIG. 21, shown is a flow diagram of method in accordance with another embodiment of the present invention. More specifically, method 2100 of FIG. 21 is a method for performing power control in an asymmetric multi-thread processor as described herein. As such, As such, method 2100 may be performed by hardware circuitry, firmware, software and/or combinations thereof, including a power controller of a processor such as PCU.

As illustrated, method 2100 may begin by receiving power and thermal budgets for the processor. Such information may be received and stored, e.g., in the PCU (block 2110). Thereafter, during normal operation performance state requests may be received for the various cores (block 2120). It is determined at diamond 2130 whether there are sufficient budgets (power and thermal) for the cores to operate at these requested performance states. If so, control passes to block 2135 where cores are enabled to operate at their requested performance states. To this end, the PCU may send control information to corresponding clock generators and voltage regulators to provide to a core a given frequency and voltage pair associated with the given performance state.

Still with reference to FIG. 21 if it is determined that there is insufficient power budget, at least one core may operate at a lower performance state (block 2140). Then during operation as cores execute at given performance states, power and thermal headroom may be monitored (block 2145). At block 2150, assume that a request is received from a single-threaded mode core to operate at a turbo mode. In response to this request it is determined at diamond 2160 whether there is sufficient headroom for this operation. If so, at block 2170 the single-threaded mode core is enabled to operate at a turbo mode frequency. If insufficient headroom is available for the requested turbo mode, no change to the performance state of the core occurs.

Note that with embodiments herein, greater capacity for overclocking may be realized by the selective disabling of multi-thread support for one or more cores. As such, this turbo mode frequency may be one or more bins (e.g., where each bin corresponds to, e.g., 100 MHz) of higher turbo mode frequency. As one example, single-thread mode cores may be enabled to operate up to a first turbo mode frequency, while multi-thread mode cores are enabled to operate up to a second mode frequency, where the second turbo mode frequency is lower than the first turbo mode frequency (e.g., by one or more bin levels). Stated another way, one or more single-threaded mode cores may be controlled to operate at higher operating frequencies than corresponding multi-threaded modes, both in normal operation modes and during overclocking or other turbo modes of operation. As a further matter, note that a baseline turbo mode frequency for single-threaded cores may be at a higher frequency than a baseline turbo mode frequency for multi-threaded cores. And it further follows that a single-threaded core may be enabled to operate at a frequency up to a higher maximum turbo mode frequency than a corresponding maximum turbo mode frequency for a multi-threaded core. Understand while shown at this high level in the embodiment of FIG. 21, many variations and alternatives are possible.

Figure 22:
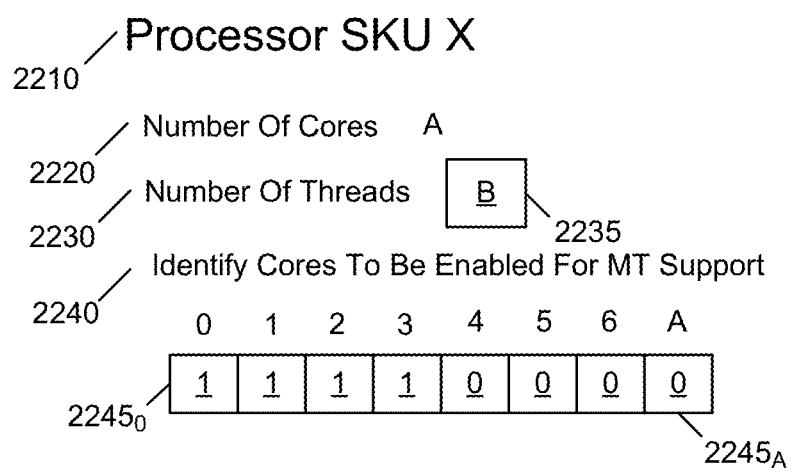
FIG. 22 is a graphical illustration of a user interface in accordance with an embodiment of the present invention.

Referring now to FIG. 22, shown is a graphical illustration of a user interface 2200 in accordance with an embodiment of the present invention. More specifically, user interface 2200 may be presented to a user during BIOS setup. As such, user interface 2200 may be displayed responsive to execution of user interface-based instructions of a BIOS. In the embodiment shown in FIG. 22, user interface 2200 identifies a given processor SKU at entry 2210. Also displayed is a number of cores of the processor at entry 2220. In this example, assume the presence of A cores (8 cores). Next, entry 2230 identifies a number of threads. Note that entry 2230 may provide a user input field 2235 to receive a user input as to a total number of available threads. As shown, assume that the user enters a given integer number (e.g., B). For example, this integer number may correspond to a user selection of a subset of the total number of available threads. For example, assume an 8-core processor having multi-thread support for 4 total threads per core, this number may be something less than the full 32 thread capability of the thread of the core. Assume for purposes of discussion that a user selects a value of B to enable 16 such threads.

In some cases, this may be all of the user-selectable configuration parameters shown in FIG. 22. In other cases, a user may optionally be allowed to identify particular cores to enable or disable for MT operation. Thus as further illustrated in FIG. 22, at optional entry 2240, user interface 2200 may provide an ability for a user to identify specific cores to be enabled/disabled for MT support. As shown, user interface fields 2245$_0$-2245$_a$ may be provided, which enables the user to identify whether to enable multi-thread support on a per core basis. As shown in this example, the user here selects (e.g., by a value of one, by convention) to enable MT support for cores 0-3 and to disable it for cores 4-A. Understand that in other embodiments, additional or different information may be provided within user interface 2200 and additional user input may be sought.

The following examples pertain to further embodiments.

In one example, a processor comprises: a plurality of cores, where each of the plurality of cores comprises a multi-threaded core to concurrently execute a plurality of threads; and a control circuit to concurrently enable at least one of the plurality of cores to operate in a single-threaded mode and at least one other of the plurality of cores to operate in a multi-threaded mode.

In an example, the processor further comprises a configuration storage to store an enable indicator for each of the plurality of cores to indicate whether the core is enabled to operate in the multi-threaded mode.

In an example, the configuration storage comprises a fuse storage.

In an example, the configuration storage is to be written by firmware.

In an example, the firmware comprises a user selection interface to enable a user to select a number of the plurality of cores to be enabled for the multi-threaded mode.

In an example, the processor further comprises a configuration register to store a selective multi-threading indicator to indicate whether the control circuit is enabled to concurrently enable operation of the processor in the single-threaded mode and the multi-threaded mode.

In an example, the processor further comprises: a power controller to control power consumption of the processor; and a memory to store a bit mask based on the enable indicator for each of the plurality of cores, where the power controller is to communicate at least a first portion of the bit mask to a first microcode engine of a first core to cause the first microcode engine to configure the first core to operate in the single-threaded mode, and communicate at least a second portion of the bit mask to a second microcode engine of a second core to cause the second microcode engine to configure the second core to operate in the multi-threaded mode.

In an example, the first microcode engine is to disable one or more multi-threading structures of the first core in response to the first portion of the bit mask.

In an example, the processor further comprises a power controller to enable a first core to operate at a turbo mode frequency, the first core enabled to operate in the single-threaded mode, where the turbo mode frequency comprises a first baseline turbo mode frequency for the single-threaded mode, the first baseline turbo mode frequency greater than a second baseline turbo mode frequency for the multi-threaded mode.

In another example, a method comprises: receiving, in a controller of a processor having a plurality of cores, a selection of an asymmetric multi-threading configuration of the processor in which at least one first core is enabled to operate in a multi-threaded mode and at least one second core is enabled to operate in a single-threaded mode; communicating first configuration information from the controller to a first engine of the at least one first core to cause the first engine to configure the at least one first core for the multi-threaded mode; and communicating second configuration information from the controller to a first engine of the at least one second core to cause the first engine of the second core to configure the at least one second core for the single-threaded mode.

In an example, the method further comprises receiving the selection of the asymmetric multi-threading configuration from a user via a user interface of a basic input/output system to enable the user to identify a number of the plurality of cores to operate in the multi-threaded mode and a number the plurality of cores to operate in the single-threaded mode.

In an example, the method further comprises receiving the selection of the asymmetric multi-threading configuration from a basic input/output system based on the selection of the asymmetric multi-threading configuration by an original equipment manufacturer.

In an example, the method further comprises: enabling the at least one first core to operate at a first operating frequency; and enabling the at least one second core to operate at a turbo mode frequency, the turbo mode frequency greater than the first operating frequency.

In an example, the method further comprises: determining that the processor has sufficient power and thermal headroom; and in response to determining that the processor has sufficient power and thermal headroom, enabling the at least one second core to operate at a second turbo mode frequency greater than a maximum turbo mode frequency at which the at least one first core can operate.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor having: a plurality of cores, where each of the plurality of cores comprises a multi-threaded core to concurrently execute a plurality of threads; and a control circuit to concurrently enable, based at least in part on selective multi-threaded configuration information, a first core of the plurality of cores to operate in a single-threaded mode and a second core of the plurality of cores to operate in a multi-threaded mode. The system further includes a non-volatile memory coupled to the processor to store a BIOS, the BIOS including: a first region to store the selective multi-threaded configuration information to identify a first subset of the plurality of cores to be enabled for the single-threaded mode and a second subset of the plurality of cores to be enabled for the multi-threaded mode; and first code to cause the selective multi-threaded configuration information to be communicated to the processor.

In an example, the BIOS further comprises second code to generate a user interface to enable a user to identify a number of the plurality of cores to be enabled for the single-threaded mode and a number of the plurality of cores to be enabled for the multi-threaded mode.

In an example, the processor further comprises a configuration storage to store an enable indicator for each of the plurality of cores to indicate whether the core is enabled to operate in the multi-threaded mode.

In an example, the BIOS further comprises a third code to write the enable indicator for each of the plurality of cores based on the selective multi-threaded configuration information.

In an example, the processor further comprises a memory to store a bit mask based on the enable indicator for each of the plurality of cores, where a first microcode engine of the first core is to enable the first core for the single-threaded mode based on a first portion of the bit mask, and a second microcode engine of the second core is to enable the second core for the multi-threaded mode based on a second portion of the bit mask.

In an example, the processor further comprises a power controller to enable the first core to operate at a turbo mode frequency, where the turbo mode frequency comprises a first baseline turbo mode frequency for the single-threaded mode, the first baseline turbo mode frequency greater than a second baseline turbo mode frequency for the multi-threaded mode.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising: a plurality of cores, wherein each of the plurality of cores comprises a multi-threaded core to concurrently execute a plurality of threads; a control circuit to concurrently enable at least one of the plurality of cores to operate in a single-threaded mode and at least one other of the plurality of cores to operate in a multi-threaded mode; and a configuration storage coupled to the control circuit to store an enable bit for each of the plurality of cores to indicate whether the core is enabled to operate in the multi-threaded mode, the configuration storage to be written during manufacture of the processor by a manufacturer of the processor with the enable bit for at least one of the plurality of cores having a value to indicate that the at least one core is not enabled to operate in the multi-threaded mode; wherein the processor is of a first stock keeping unit, wherein the first stock keeping unit has N cores and M threads, M less than 2N and N greater than one, based at least in part on the enable bit for each of the plurality of cores; and a configuration register to store a selective multi-threading indicator to concurrently enable operation of the processor in the single-threaded mode and the multi-threaded mode.

2. The processor of claim 1, wherein the configuration storage comprises a fuse storage.

3. The processor of claim 1, further comprising a configuration register to store a selective multi-threading indicator to indicate whether the control circuit is enabled to concurrently enable operation of the processor in the single-threaded mode and the multi-threaded mode.

4. The processor of claim 1, further comprising:
a power controller to independently control power consumption comprising a voltage and a frequency of the plurality of cores; and
a memory to store a bit mask based on the enable bit for each of the plurality of cores, wherein the power controller is to communicate at least a first portion of the bit mask to a first microcode engine of a first core to cause the first microcode engine to configure the first core to operate in the single-threaded mode, and communicate at least a second portion of the bit mask to a second microcode engine of a second core to cause the second microcode engine to configure the second core to operate in the multi-threaded mode.

5. The processor of claim 4, wherein the first microcode engine is to disable one or more multi-threading structures of the first core in response to the first portion of the bit mask.

6. The processor of claim 4, wherein the power controller is to enable a first core to operate at a turbo mode frequency, the first core enabled to operate in the single-threaded mode, wherein the turbo mode frequency comprises a first baseline turbo mode frequency for the single-threaded mode, the first baseline turbo mode frequency greater than a second baseline turbo mode frequency for the multi-threaded mode.

7. The processor of claim 1, wherein the configuration storage further comprises thread information to indicate that less than a full number of hardware threads of the at least one other core is to be enabled.

8. The processor of claim 1, wherein in response to the enable bit for each of the plurality of cores, the control circuit is to selectively enable a first subset of the plurality of cores to operate in the multi-threaded mode and prevent a second subset of the plurality of cores from operation in the multi-threaded mode.

9. A system comprising:
a processor comprising:
a plurality of cores, wherein each of the plurality of cores comprises a multi-threaded core to concurrently execute a plurality of threads;
a control circuit to concurrently enable at least one of the plurality of cores to operate in a single-threaded mode and at least one other of the plurality of cores to operate in a multi-threaded mode; and
a configuration storage coupled to the control circuit to store an enable bit for each of the plurality of cores to indicate whether the core is enabled to operate in the multi-threaded mode, wherein the processor is of a first stock keeping unit having N cores and M threads, M less than 2N and N greater than one, based at least in part on the enable bit for each of the plurality of cores; and
a non-volatile memory coupled to the processor to store a basic input/output system (BIOS), the BIOS including:
a first region to store selective multi-threaded configuration information to identify a first subset of the plurality of cores to be enabled for the single-threaded mode and a second subset of the plurality of cores to be enabled for the multi-threaded mode; and
first code to cause the selective multi-threaded configuration information to be communicated to the processor and to store a selective multi-threading indicator to concurrently enable operation of the processor in the single-threaded mode and the multi-threaded mode.

10. The system of claim 9, wherein the BIOS further comprises second code to generate a user interface to enable a user to identify a number of the plurality of cores to be enabled for the single-threaded mode and a number of the plurality of cores to be enabled for the multi-threaded mode.

11. The system of claim 9, wherein the BIOS further comprises a third code to write the enable bit for each of the plurality of cores based on the selective multi-threaded configuration information.

12. The system of claim 11, wherein the processor further comprises a memory to store a bit mask based on the enable bit for each of the plurality of cores, wherein a first microcode engine of the first core is to enable a first core for the single-threaded mode based on a first portion of the bit mask, and a second microcode engine of a second core is to enable the second core for the multi-threaded mode based on a second portion of the bit mask.

13. The system of claim 9, wherein the processor further comprises a power controller to enable a first core to operate at a turbo mode frequency, wherein the turbo mode frequency comprises a first baseline turbo mode frequency for the single-threaded mode, the first baseline turbo mode frequency greater than a second baseline turbo mode frequency for the multi-threaded mode.

14. The processor of claim 2, wherein the fuse storage comprises fuse information to enable the multi-threaded mode for one or more first cores and to disable the multi-threaded mode for one or more second cores.

15. The processor of claim 14, wherein the first cores and the second cores are homogeneous cores.

16. The processor of claim 14, wherein the second cores have hardware support for the multi-threaded mode.

17. A system comprising:
a processor having a semiconductor die comprising:
a plurality of cores, wherein each of the plurality of cores comprises a multi-threaded core to concurrently execute a plurality of threads;
a fuse storage to store fuse information to indicate that a first subset of the plurality of cores is enabled to operate in a multi-threaded mode and that a second subset of the plurality of cores is not enabled to operate in the multi-threaded mode, the fuse information written during manufacture of the processor by a manufacturer of the processor, wherein the processor is of a first stock keeping unit having N cores and M threads, M less than 2N and N greater than one, based at least in part on the fuse information; and a configuration register to store a selective multi-threading indicator to concurrently enable operation of the processor in the single-threaded mode and the multi-threaded mode; and a non-volatile memory coupled to the processor, the non-volatile memory to store a basic input/output system.

18. The system of claim 17, wherein the processor comprises a control circuit, in response to the fuse information, to concurrently enable the first subset to operate in the multi-threaded mode and prevent the second subset from operation in the multi-threaded mode.

\* \* \* \* \*